(12) United States Patent
Ghatare et al.

(10) Patent No.: US 10,115,136 B2
(45) Date of Patent: Oct. 30, 2018

(54) BUILDING CONTAINERS OF UNCATEGORIZED ITEMS AT MULTIPLE LOCATIONS

(71) Applicants: Sanjay Pundlkrao Ghatare, San Jose, CA (US); Praveen K. Jayaraman, Santa Clara, CA (US); Sandip Namdeo Gaikwad, Sunnyvale, CA (US); Ashit Jain, San Jose, CA (US); Joseph Anthony Beynon, Mountain View, CA (US); Suhail Ansari, Sunnyvale, CA (US); Hugh Evan Williams, Saratoga, CA (US); Niteen Bhat, Los Altos, CA (US)

(72) Inventors: Sanjay Pundlkrao Ghatare, San Jose, CA (US); Praveen K. Jayaraman, Santa Clara, CA (US); Sandip Namdeo Gaikwad, Sunnyvale, CA (US); Ashit Jain, San Jose, CA (US); Joseph Anthony Beynon, Mountain View, CA (US); Suhail Ansari, Sunnyvale, CA (US); Hugh Evan Williams, Saratoga, CA (US); Niteen Bhat, Los Altos, CA (US)

(73) Assignee: eBay Inc., San Jose, CA (US)

( * ) Notice: Subject to any disclaimer, the term of this patent is extended or adjusted under 35 U.S.C. 154(b) by 715 days.

(21) Appl. No.: 13/967,171

(22) Filed: Aug. 14, 2013

(65) Prior Publication Data

US 2014/0052579 A1 Feb. 20, 2014

Related U.S. Application Data

(60) Provisional application No. 61/683,070, filed on Aug. 14, 2012, provisional application No. 61/776,222, filed on Mar. 11, 2013.

(51) Int. Cl.
*G06Q 30/00* (2012.01)
*G06Q 30/06* (2012.01)
(Continued)

(52) U.S. Cl.
CPC ... *G06Q 30/0603* (2013.01); *G06F 17/30554* (2013.01); *G06F 17/30864* (2013.01);
(Continued)

(58) Field of Classification Search
CPC .......................................... G06Q 30/06–30/08
(Continued)

(56) References Cited

U.S. PATENT DOCUMENTS

| 5,978,800 A | 11/1999 | Yokoyama et al. |
| 8,214,827 B2 | 7/2012 | Ben-arie et al. |

(Continued)

FOREIGN PATENT DOCUMENTS

| WO | WO-2014028643 A2 | 2/2014 |
| WO | WO-2014028643 A3 | 2/2014 |

OTHER PUBLICATIONS

"U.S. Appl. No. 13/966,978, Examiner Interview Summary dated May 21, 2015", 3 pgs.
(Continued)

*Primary Examiner* — Ethan D Civan
(74) *Attorney, Agent, or Firm* — Shook, Hardy & Bacon L.L.P.

(57) ABSTRACT

Methods and systems to build containers of uncategorized items are described. In some example embodiments, the methods and systems access a search request for items available for purchase via a network-based location, collect information associated with available items having product description information satisfying the search request and located at multiple network-based locations, determine one or more containers that associate items available for pur-
(Continued)

chase based on the collected information, and publish a result for the search request that is based on the determined containers.

20 Claims, 18 Drawing Sheets

(51) Int. Cl.
*G06Q 10/08* (2012.01)
*G06F 17/30* (2006.01)
*G06Q 30/08* (2012.01)

(52) U.S. Cl.
CPC ....... *G06Q 10/087* (2013.01); *G06Q 30/0623* (2013.01); *G06Q 30/0625* (2013.01); *G06Q 30/0641* (2013.01); *G06Q 30/08* (2013.01); *H05K 999/00* (2013.01)

(58) Field of Classification Search
USPC ............................................. 705/26.1–27.2
See application file for complete search history.

(56) References Cited

U.S. PATENT DOCUMENTS

| | | | |
|---|---|---|---|
| 8,589,429 | B1 | 11/2013 | Thirumalai et al. |
| 9,552,601 | B2 | 1/2017 | Ghatare et al. |
| 9,852,458 | B2 | 12/2017 | Ghatare et al. |
| 2003/0210278 | A1 | 11/2003 | Kyoya et al. |
| 2006/0143080 | A1 | 6/2006 | Garg et al. |
| 2007/0073591 | A1 | 3/2007 | Perry et al. |
| 2007/0288433 | A1 | 12/2007 | Gupta et al. |
| 2009/0198541 | A1 | 8/2009 | Dolan et al. |
| 2009/0215055 | A1 | 8/2009 | French et al. |
| 2009/0281927 | A1* | 11/2009 | Aliabadi ................ G06Q 30/02 705/26.1 |
| 2010/0262495 | A1 | 10/2010 | Dumon et al. |
| 2010/0262615 | A1* | 10/2010 | Oztekin ............ G06F 17/30707 707/768 |
| 2011/0078045 | A1 | 3/2011 | Tuflija et al. |
| 2011/0106851 | A1 | 5/2011 | Swartz |
| 2011/0161182 | A1 | 6/2011 | Racco |
| 2012/0173472 | A1 | 7/2012 | Hunt et al. |
| 2012/0191719 | A1 | 7/2012 | Musgrove et al. |
| 2012/0253891 | A1 | 10/2012 | Hayes et al. |
| 2012/0259844 | A1 | 10/2012 | Yuan et al. |
| 2013/0041778 | A1 | 2/2013 | Nativ et al. |
| 2013/0282698 | A1 | 10/2013 | Oztekin et al. |
| 2014/0052547 | A1 | 2/2014 | Ghatare et al. |
| 2014/0052589 | A1 | 2/2014 | Ghatare et al. |
| 2014/0052719 | A1 | 2/2014 | Ghatare et al. |
| 2017/0132298 | A1 | 5/2017 | Ghatare et al. |
| 2018/0089730 | A1 | 3/2018 | Ghatare et al. |

OTHER PUBLICATIONS

"U.S. Appl. No. 13/966,978, Examiner Interview Summary dated Nov. 19, 2014", 3 pgs.
"U.S. Appl. No. 13/966,978, Final Office Action dated Apr. 9, 2015", 11 pgs.
"U.S. Appl. No. 13/966,978, Non Final Office Action dated Oct. 3, 2014", 9 pgs.
"U.S. Appl. No. 13/966,978, Response filed Mar. 3, 2015 to Non Final Office Action dated Oct. 3, 2014", 30 pgs.
"U.S. Appl. No. 13/966,978, Response filed Sep. 9, 2015 to Final Office Action dated Apr. 9, 2015", 22 pgs.
"U.S. Appl. No. 13/967,162, Non Final Office Action dated Jul. 30, 2015", 13 pgs.
"International Application Serial No. PCT/US2013/054984, International Preliminary Report on Patentability dated Jun. 18, 2015", 6 pgs.
"International Application Serial No. PCT/US2013/054984, International Search Report dated Jan. 16, 2014", 2 pgs.
"International Application Serial No. PCT/US2013/054984, Written Opinion dated Jan. 16, 2014", 5 pgs.
"U.S. Appl. No. 13/966,950, Final Office Action dated Jan. 27, 2017", 22 pgs.
"U.S. Appl. No. 13/966,950, Non Final Office Action dated Jun. 28, 2016", 28 pgs.
"U.S. Appl. No. 13/966,950, Response filed Oct. 28, 2016 to Non Final Office Action dated Jun. 28, 2016", 11 pgs.
"U.S. Appl. No. 13/966,978, Final Office Action dated Oct. 20, 2016", 9 pgs.
"U.S. Appl. No. 13/966,978, Non Final Office Action dated Jan. 14, 2016", 8 pgs.
"U.S. Appl. No. 13/966,978, Response filed Jul. 14, 2016 to Non Final Office Action dated Jan. 14, 2016", 19 pgs.
"U.S. Appl. No. 13/967,162, Corrected Notice of Allowance dated Oct. 13, 2016", 5 pgs.
"U.S. Appl. No. 13/967,162, Examiner Interview Summary dated May 19, 2016", 3 pgs.
"U.S. Appl. No. 13/967,162, Final Office Action dated Apr. 21, 2016", 9 pgs.
"U.S. Appl. No. 13/967,162, Notice of Allowance dated Sep. 12, 2016", 8 pgs.
"U.S. Appl. No. 13/967,162, Response filed Jun. 21, 2016 to Final Office Action dated Apr. 21, 2016", 12 pgs.
"U.S. Appl. No. 13/967,162, Response filed Dec. 30, 2015 to Non Final Office Action dated Jul. 30, 2015", 13 pgs.
"U.S. Appl. No. 15/412,969, Preliminary Amendment filed Feb. 24, 2017", 7 pgs.
"U.S. Appl. No. 13/966,978, Examiner Interview Summary dated Jun. 26, 2017", 3 pgs.
"U.S. Appl. No. 13/966,978, Response filed Apr. 20, 2017 to Fina lOffice Action dated Oct. 20, 2016", 20 pgs.
"U.S. Appl. No. 15/412,969, Non Final Office Action dated Jun. 15, 2017", 23 pgs.
Notice of Allowance received for U.S. Appl. No. 13/966,978, dated Aug. 16, 2017, 7 pages.
Applicant Interview Summary received for U.S. Appl. No. 15/412,969, dated Feb. 14, 2018, 3 pages.
Final Office Action received for U.S. Appl. No. 15/412,969, dated Dec. 8, 2017, 26 pages.
Response to Final Office Action filed on Mar. 8, 2018, for U.S. Appl. No. 15/412,969, dated Dec. 8, 2017, 27 pages.
Response to Non-Final Office Action filed on Aug. 29, 2017, for U.S. Appl. No. 15/412,969, dated Jun. 15, 2017, 15 pages.
Preliminary Amendment for U.S. Appl. No. 15/830,505, filed Mar. 2, 2018, 8 pages.
Non-Final Office Action received for U.S. Appl. No. 15/412,969, dated Jun. 14, 2018, 30 pages.

* cited by examiner

1500

1505 — RESULTS FOR "BABY CARRIERS"
1510 — TITLE: MOBY-WRAP-BABY [100+ ITEMS, 6 LOCAL]
1520 — TITLE: BJORN-CARRIER-BLUE-SOFT [45 ITEMS, 1 LOCAL]
1530 — TITLE: BJORN-CARRIER-RED-SOFT [23 ITEMS, 3 LOCAL]
1540 — ITEM: BABY NEST SLING [16 ITEMS, 0 LOCAL]
1550 — TITLE: BABY-SLINGS [100+ ITEMS, 21 LOCAL]
1560 — MORE

FIG. 15

BUILDING CONTAINERS OF UNCATEGORIZED ITEMS AT MULTIPLE LOCATIONS

CROSS REFERENCES TO RELATED APPLICATIONS

This application claims priority to U.S. Provisional Patent Application No. 61/683,070, filed on Aug. 14, 2012, entitled BUILDING CONTAINERS OF UNCATEGORIZED ITEMS, and U.S. Provisional Patent Application No. 61/776,222, filed on Mar. 11, 2013, entitled DISPLAYING SEARCH RESULT LISTINGS ASSOCIATED WITH CONTAINERS OF ITEMS, which are hereby incorporated by reference in their entirety.

TECHNICAL FIELD

This application relates generally to information retrieval and, specifically, to displaying or presenting information associated with containers of products.

BACKGROUND

General merchandising of items for sale via a network-based merchandising system is well-known. Many websites accessible via the Internet are operated as online stores or auctions. These websites enable users to purchase items that may be physical items (e.g., an article of clothing), electronic data items (e.g., a downloadable digital media product), or services to be rendered by an affiliated service provider. These websites provide many different products for purchase, including products of similar or identical items.

BRIEF DESCRIPTION OF THE DRAWINGS

The present technology is illustrated by way of example, and not by way of limitation, in the figures of the accompanying drawings.

FIG. 15 is a display diagram illustrating a results page that includes a listing associated with a container of uncategorized items from multiple networked locations, in some example embodiments.

DETAILED DESCRIPTION

Overview

Methods and systems to build containers of uncategorized items are described. In some example embodiments, the methods and systems enable a publication system to generate and maintain a dedicated product display page for a container of uncategorized, uncataloged or unlisted products, such as a dynamically changing inventory of uncategorized products. The product display page may provide information about products or items associated with a container as well as facilitate the purchase of available products via the product display page.

In some example embodiments, the methods and systems access a search request for items available for purchase via a network-based location, collect information associated with available items having product description information satisfying the search request and located at multiple network-based locations, determine one or more containers that associate items available for purchase based on the collected information, and publish a result for the search request that is based on the determined containers.

Figure 1A:
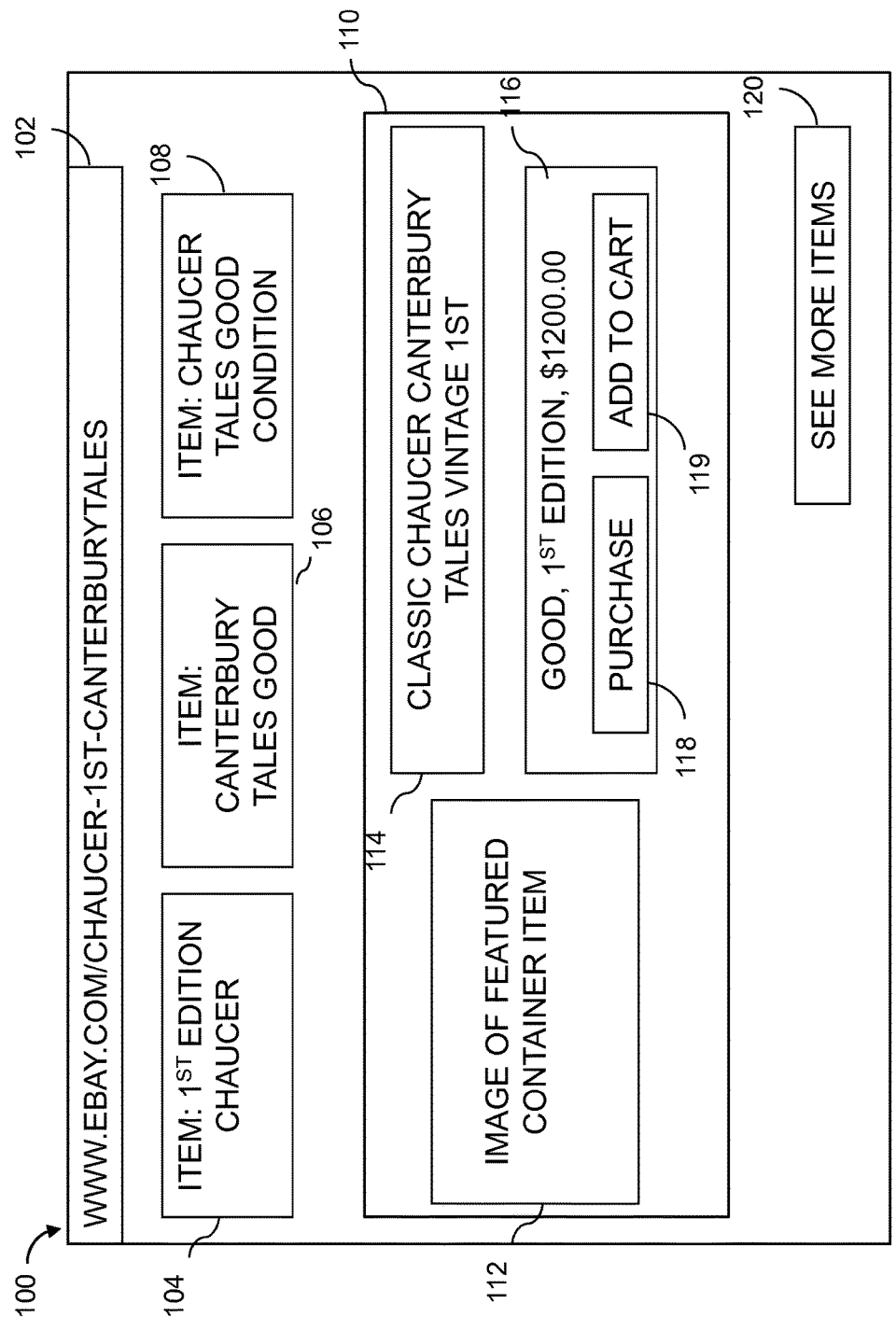
FIG. 1A is a display diagram illustrating an example container page within a publication system, in some example embodiments.

For example, FIG. 1A is a display diagram illustrating an example container page 100 within a publication system, in some example embodiments. The container page 100, which may be a product purchase page published by the publication system, may be associated with a uniform resource locator (URL) 102 that includes a title for a container represented by the container page 100. The container page 100 may display various user interface (UI) elements and other information for items associated with the container, such as uncategorized items available for purchase within the publication system that are associated with the container.

The container page 100 includes graphical UI elements for various different items associated with the container entitled "Chaucer 1$^{st}$ Canterbury Tales," such as a graphical element 104 that presents product description information for an associated item entitled "1$^{st}$ edition Chaucer," a graphical element 106 that presents product description information for an associated item entitled "Canterbury Tales Good," and a graphical element 108 that presents product description information for an associated item entitled "Chaucer Tales Good Condition."

The container page 100 also includes a graphical element 110 for a featured item that is associated with the container. The graphical element 110 displays an image 112 for the featured item title 114 for the featured item ("Classic Chaucer Canterbury Tales Vintage $1^{st}$"), and an element 116 that presents product description information for the featured item, such as condition information, pricing information, and so on. Additionally, the element 116 includes various user-selectable elements that facilitate a purchase, order, or other action associated with purchasing the featured item 114, such as a user-selectable element 118 that, when selected, facilitates a direct purchase of the featured item 114, a user-selectable element 119 that, when selected, facilitates the addition of the item to an online shopping cart provided by the publication system, and so on. The container page may also display other elements, such as an element 120 that, when selected, causes the display of description information for other items associated with the container, among other things.

Figure 1B:
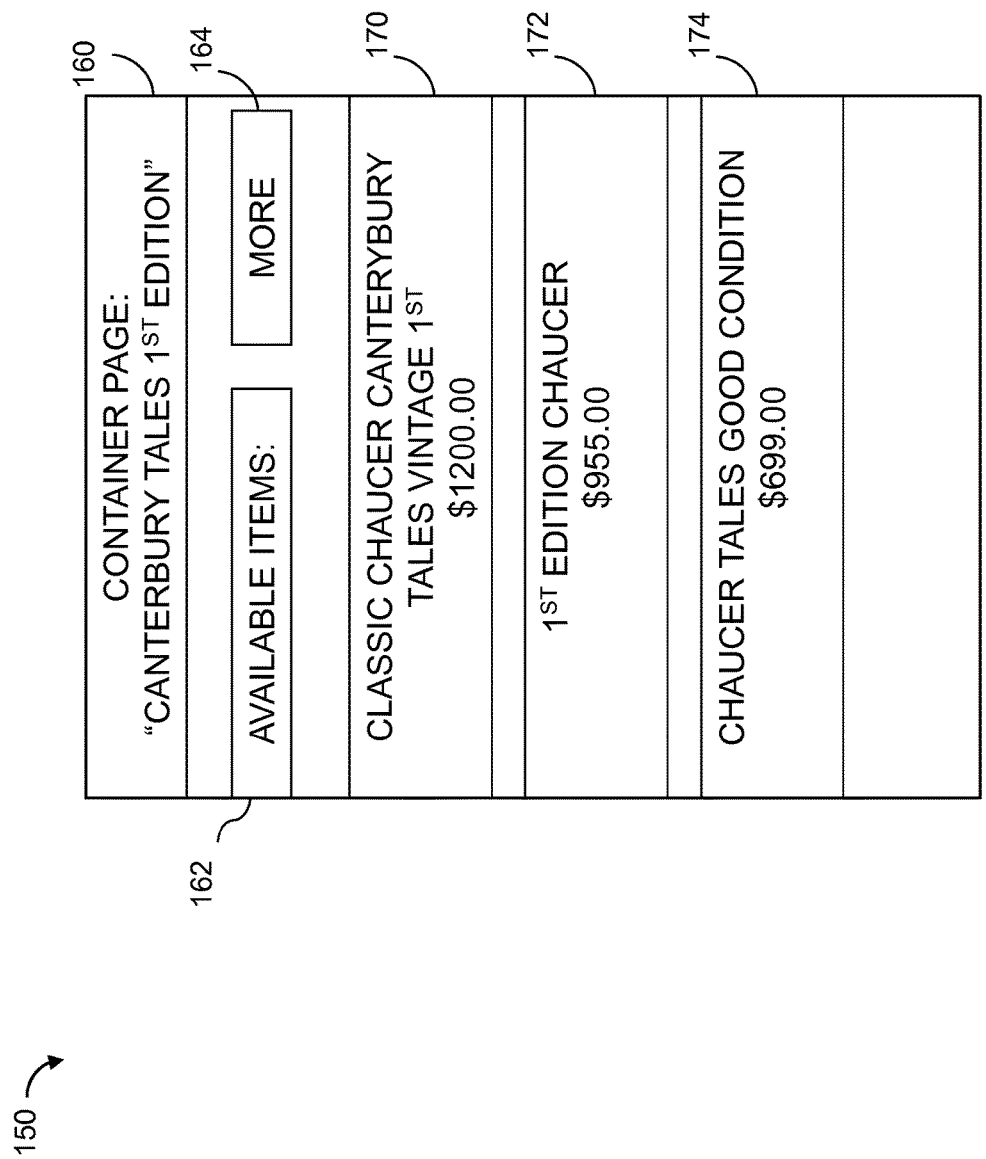
FIG. 1B is a display diagram illustrating an example mobile-based container page within a publication system, in some example embodiments.

FIG. 1B is a display diagram illustrating an example mobile-based container page 150 within a publication system, in some example embodiments. The mobile-based container page 150 may be configured to display a container-based product purchase page for a container. For example, the mobile-based container page 150 may display the title of the container ("Canterbury Tales $1^{st}$ Edition"), a graphical element 162 identifying items available for purchase that are associated with the container, a user-selectable element that, when selected, causes the mobile-based container page 150 to display additional information, and product description information for various items available for purchase within a publication system that are associated with the container. For example, the mobile-based container page 150 may present a user-selectable graphical element 170 that displays product description information for an item entitled "Classic Chaucer Canterbury Tales Vintage $1^{st}$," a user-selectable graphical element 172 that displays product description information for an item entitled "$1^{st}$ Edition Chaucer," and a user-selectable graphical element 174 that displays product description information for an item entitled "Chaucer Tales Good Condition," among other things.

Thus, in some example embodiments, the methods and systems described herein enable a publication system to maintain, present, and/or publish a product display page or purchase page for a dynamically changing set of similar products or items, enabling the publication system to maintain a dedicated page for a certain category of products whose inventory changes over time, among other benefits.

Suitable System

In the following description, for purposes of explanation, numerous specific details are set forth in order to provide a thorough understanding of the present disclosure. It may be evident, however, to one skilled in the art that the subject matter of the present disclosure may be practiced without these specific details.

Figure 2:
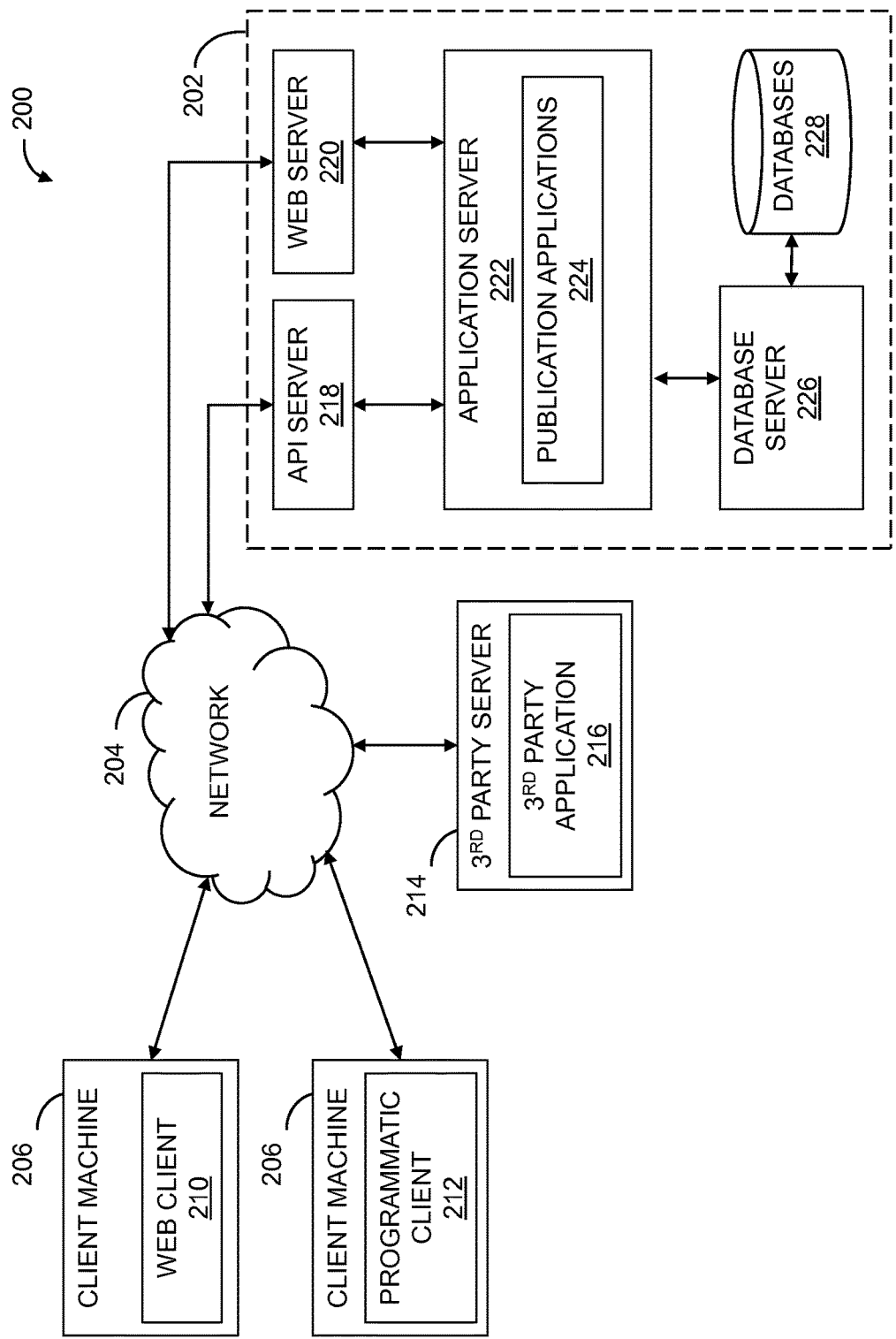
FIG. 2 is a block diagram illustrating a network architecture of a suitable computing environment for building and providing containers and container pages, in some example embodiments.

FIG. 2 is a block diagram illustrating a network architecture of a system 200 used to build containers of uncategorized items, in some example embodiments. For example, the network system 200 may be a publication/publisher system 202 where clients may communicate and exchange data within the network system 200. The data may pertain to various functions (e.g., selling and purchasing of items) and aspects (e.g., data describing items listed on the publication/publisher system) associated with the network system 200 and its users. Although illustrated herein as a client-server architecture as an example, other example embodiments may include other network architectures, such as a peer-to-peer or distributed network environment.

A data exchange platform, in an example form of a network-based publisher 202, may provide server-side functionality via a network 204 (e.g., the Internet) to one or more clients. The one or more clients may include users that utilize the network system 200 and more specifically, the network-based publisher 202, to exchange data over the network 214. These transactions may include transmitting, receiving (communicating) and processing data to, from, and regarding content and users of the network system 200. The data may include, but are not limited to, content and user data such as feedback data; user reputation values; user profiles; user attributes; product and service reviews; product, service, manufacturer, and vendor recommendations and identifiers; product and service listings associated with buyers and sellers; auction bids; and transaction data, among other things.

In various embodiments, the data exchanges within the network system 200 may be dependent upon user-selected functions available through one or more client or user interfaces (UIs). The UIs may be associated with a client machine, such as a client machine 206 using a web client 210. The web client 210 may be in communication with the network-based publisher 202 via a web server 220. The UIs may also be associated with a client machine 208 using a programmatic client 212, such as a client application, or a third party server 214 hosting a third party application 216. It can be appreciated in various embodiments the client machine 206, 208, or third party application 214 may be associated with a buyer, a seller, a third party electronic commerce platform, a payment service provider, or a shipping service provider, each in communication with the network-based publisher 202 and optionally each other. The buyers and sellers may be any one of individuals, merchants, or service providers, among other things.

Turning to the network-based publisher 202, an application program interface (API) server 218 and a web server 220 are coupled to, and provide programmatic and web interfaces respectively to, one or more application servers 222. The application servers 222 host one or more publication application (s) 224. The application servers 222 are, in turn, shown to be coupled to one or more database server(s) 226 that facilitate access to one or more database(s) 228.

In some example embodiments, the web server 220 and the API server 218 communicate and receive data pertaining to listings, transactions, and feedback, among other things, via various user input tools. For example, the web server 220 may send and receive data to and from a toolbar or webpage on a browser application (e.g., web client 210) operating on a client machine (e.g., client machine 206). The API server 218 may send and receive data to and from an application (e.g., client application 212 or third party application 216) running on another client machine (e.g., client machine 208 or third party server 214).

The publication application(s) 224 may provide a number of publisher functions and services (e.g., search, listing, payment, etc.) to users that access the network-based publisher 202. For example, the publication application(s) 224 may provide a number of services and functions to users for listing goods and/or services for sale, searching for goods and services, facilitating transactions, and reviewing and providing feedback about transactions and associated users. Additionally, the publication application(s) 224 may track and store data and metadata relating to listings, transactions, and user interactions with the network-based publisher 202.

FIG. 2 also illustrates a third party application 216 that may execute on a third party server 214 and may have programmatic access to the network-based publisher 202 via the programmatic interface provided by the API server 218. For example, the third party application 216 may use information retrieved from the network-based publisher 202 to support one or more features or functions on a website hosted by the third party. The third party website may, for example, provide one or more listing, feedback, publisher or payment functions that are supported by the relevant applications of the network-based publisher 202.

While the example network system 200 of FIG. 2 employs a client-server architecture, a skilled artisan will recognize that the present disclosure is not limited to such an architecture. The example network architecture 200 can equally well find application in, for example, a distributed or peer-to-peer architecture system.

Figure 3:
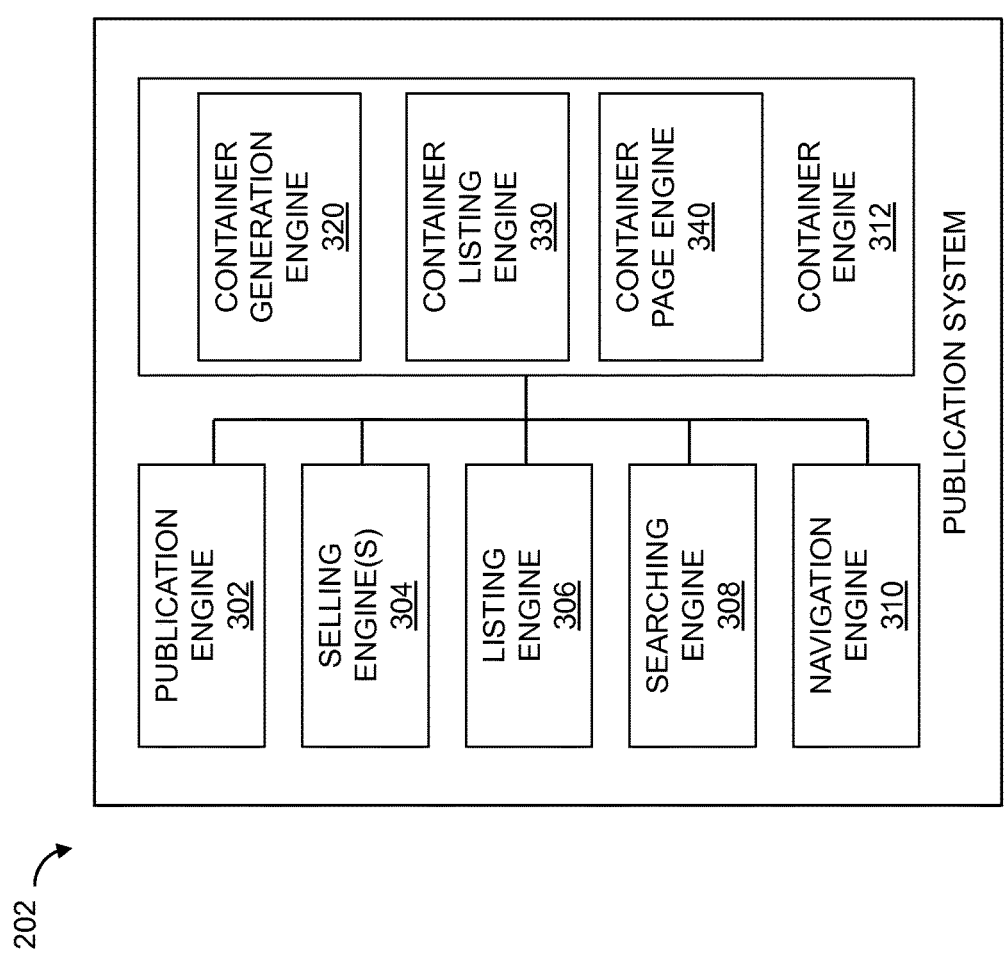
FIG. 3 is a block diagram illustrating a publication system of available products, in some example embodiments.

Referring now to FIG. 3, an example block diagram illustrating multiple components that, in some example embodiments, are provided within the publication system 202 of the networked system 200 is shown. The publication system 202 may be hosted on dedicated or shared server machines (not shown) that are communicatively coupled to enable communications between the server machines. The multiple components, themselves, are communicatively coupled (e.g., via appropriate interfaces), either directly or indirectly, to each other and to various data sources, to allow information to be passed between the components or to allow the components to share and access common data. Furthermore, the components may access the one or more database(s) 228 via the one or more database servers 226, both shown in FIG. 2.

In some example embodiments, the publication system 202 comprises a network-based marketplace and provides a number of publishing, listing, and price-setting mechanisms whereby a seller (e.g., business or consumer) may list (or publish information concerning) goods or services for sale, a buyer can search for, express interest in, or indicate a desire to purchase such goods or services, and a price can be set for a transaction pertaining to the goods or services. To this end, the publication system 202 may comprise at least one publication engine 302 and one or more selling engines 304.

The publication engine 302 may publish information, such as item listings, product description pages, and/or container pages, on the publication system 302. In some example embodiments, the selling engines 304 may comprise one or more auction engines that support auction-format listing and price setting mechanisms (e.g., English, Dutch, Chinese, Double, Reverse auctions, and so on). The various auction engines may also provide a number of features in support of these auction-format listings, such as a reserve price feature whereby a seller may specify a reserve price in connection with a listing and a proxy-bidding feature whereby a bidder may invoke automated proxy bidding.

A listing engine 306 allows sellers to conveniently author listings of items or authors to author publications. In some example embodiments, the listings pertain to goods or services that a user (e.g., a seller) wishes to transact via the publication system 202. Each good or service is associated with a particular category. The listing engine 306 may receive listing data such as title, description, and aspect name/value pairs. Furthermore, each listing for a good or service may be assigned an item identifier. In some example embodiments, a user may create a listing that is an advertisement or other form of information publication. The listing information may then be stored to one or more storage devices coupled to the publication system 202 (e.g., databases 228). Listings also may comprise product description pages that display a product and information (e.g., product title, specifications, reviews, and so on) associated with the product. In some example embodiments, the product description page may include an aggregation of item listings that correspond to the product described on the product description page.

Searching the network-based publication system 202 is facilitated by a searching engine 308. For example, the searching engine 308 enables keyword queries of listings published via the publication system 202. In some example embodiments, the searching engine 308 receives the keyword queries from a computing device associated with a user and conducts a review of the storage device storing the listing information. The review will enable compilation of a result set of listings that may be sorted and returned to the client device (e.g., client device 206) of the user. The searching engine 308 may record the query (e.g., keywords) and any subsequent user actions and behaviors (e.g., navigations).

In a further example, a navigation engine 310 allows users to navigate through various categories, catalogs, or inventory data structures according to which listings may be classified within the publication system 202. For example, the navigation engine 310 allows a user to successively navigate down a category tree comprising a hierarchy of categories until a particular set of listings is reached. Various other navigation applications within the navigation engine 310 may be provided to supplement the searching and browsing applications. The navigation engine 310 may record the various user actions (e.g., clicks) performed by the user in order to navigate down the category tree.

In some example embodiments, a container engine 312 may generate, create, and/or select a container in which to associate one or more items, such as uncategorized products within the publication system 202. The container engine 312 may generate a container and/or a title for a container based on received search queries, based on titles of products within or previously within the publication system 202, and so on. For example, the container engine 312 may include a container generation engine 320 that is configured to build containers and generate titles for containers, a container listing engine 330 that is configured to return container-based results to search queries received by the publication system 202, and a container page engine 340 that is configured to cause a container-based product purchase page (e.g., page 100 or 150) to be displayed by the publication system 202, among other things.

For example, the container page engine 340 may generate a product display page, product description page, and/or a product purchase page for a container, such as pages 100 and/or 150. The generated page may include descriptions of some or all of the products or items associated with the container, and may facilitate the selection, bidding on, and/or purchase of products via the generated page. Furthermore, the generated page may include information or links to other pages, such as pages associated with or otherwise linked to containers that include products similar to the displayed products. Further details regarding container-based product display pages are described herein.

Although the various components of the publication system 202 have been discussed in terms of a variety of individual modules and engines, a skilled artisan will recognize that many of the components can be combined or organized in other ways. Furthermore, not all components of the publication system 202 have been included in FIG. 3. In general, components, protocols, structures, and techniques not directly related to functions of example embodiments (e.g., dispute resolution engine, loyalty promotion engine, reputation engines, listing management engines, account engine) have not been shown or discussed in detail. The description given herein simply provides a variety of example embodiments to aid the reader in an understanding of the systems and methods used herein.

Examples of Building Containers of Uncategorized Items

As described herein, in some example embodiments, the methods and systems may generate and/or select containers based on natural search queries and/or titles of products within the publication system 202, and provide, generate, render, or otherwise publish product display pages for each of the containers. The publication system 202, therefore, may maintain and display a product display page for a container of uncategorized items. The systems and methods described herein may facilitate the selection of containers, the titling of containers, the clustering of items, the association of clusters, and so on.

Thus, the container engine 212, via the container generation engine 320, may associate and/or cluster current and/or future products or items available for purchase within the publication system 212 into one or more containers, which may enable the publication system 202 to maintain the containers while an inventory of products or items associated with the containers changes over time.

Figure 4:
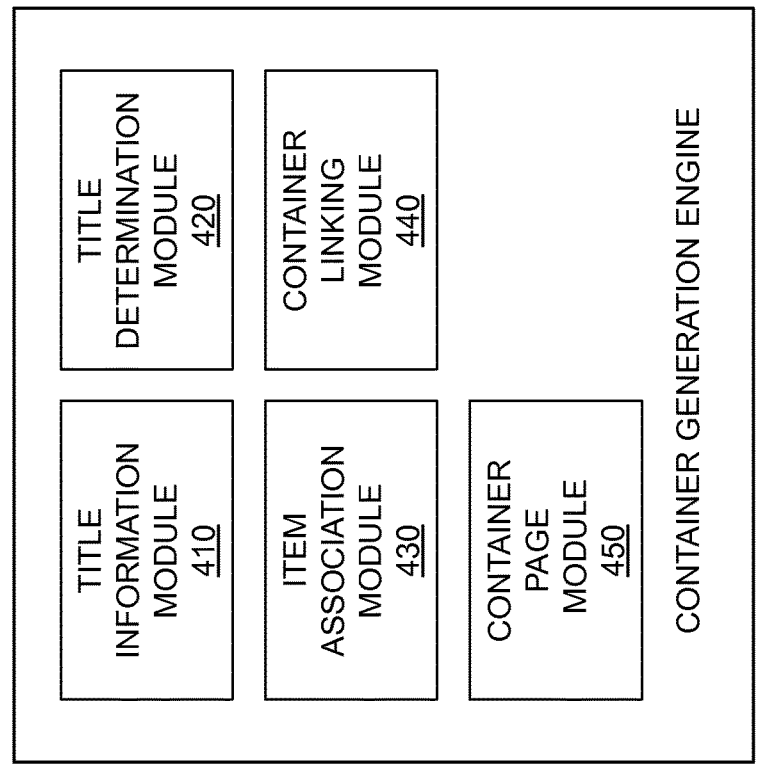
FIG. 4 is a block diagram illustrating a container generation engine, in some example embodiments.

FIG. 4 is a block diagram illustrating the container generation engine 320, in some example embodiments. As illustrated in FIG. 4, the container generation engine 320 includes a variety of functional modules. One skilled in the art will appreciate that the functional modules are implemented with a combination of software (e.g., executable instructions, or computer code) and hardware (e.g., at least a memory and processor). Accordingly, as used herein, in some example embodiments a module is a processor-implemented module and represents a computing device having a processor that is at least temporarily configured and/or programmed by executable instructions stored in memory to perform one or more of the particular functions that are described herein. Referring to FIG. 4, the container generation engine 320 includes a title information module 410, a title determination module 420, an item association module 430, a container linking module 440, and a container page module 450.

In some example embodiments, the title information module 410 is configured and/or programmed to collect information from titles of items available for purchase within the network-based publication system 202. For example, the title information module 410 may build a dictionary of titles from the titles of items available for purchase within the network-based publication system 202 and/or from contents (e.g., keywords) of search queries received by the network-based publication system 202, and/or titles or search queries at titles of items available for purchase at multiple network-based publication systems, among other locations.

For example, when selecting container titles, the title information module 410 may build a title corpus of natural search queries to the publication system 202 (e.g., an online retailer or broker) and/or of titles listed by the publication system 202 for products or items available for purchase via the publication system 202. For each title, the title information module 410 may remove or ignore noise words (e.g., "the") based on low probability tokens of a broad match result set for the title. The title information module 410 may then build a corpus of filtered titles that is based on titles of available products, keywords within search queries, and so on.

In some example embodiments, the title determination module 420 is configured and/or programmed to generate or otherwise determine a title for a container of uncategorized items available for purchase within the network-based publication system 202 that is based on the collected information. The title determination module 420 may generate titles based on contents of search queries received by the network-based publication system 202 and/or based on the titles of items available for purchase within the network-based publication system 202, based on a number of uncategorized items available for purchase to be associated to the container, and so on.

For example, the title determination module 420 may generate a title that is specific enough to be associated with multiple homogeneous listings of a specific item, irrespective of the seller/format/price/condition of the items. For example, "PUR DS 1800Z 2 Stage Water Dispenser," may be a generated title for a container associated with a specific water dispenser available for purchase within the publication system 202 that is represented by multiple similar product listings within the publication system 202.

When selecting an order of the words of a container title, the title determination module 420 may utilize a majority word order or other techniques for normalized title equivalents. In some example embodiments, the title determination module 420 may select words and/or word order for titles in order to target a certain level of traffic (e.g., item or page view traffic), and may rate or rank titles based on a variety of factors, including a probability of maintaining the container over a certain time period, a number of items that may match the title, and so on.

For example, the title determination module 420 may generate a title for the container that is based on, but different than, the titles of the items available for purchase within the network-based publication system 202, such as a title that shares a certain number of words with various titles of the items available for purchase.

In some example embodiments, the item association module 430 is configured and/or programmed to associate one or more uncategorized items available for purchase within the network-based publication system 202 to the container based on a comparison of titles of the uncategorized items and the generated title for the container of uncategorized items. The item association module 430 may associate an uncategorized item to the container when a title for the uncategorized item includes a number of token words that match words of the generated title for the container that is above a threshold number for associating items to containers, and/or may associate an uncategorized item to the container when a percentage of token words of a title for the uncategorized item matching words of the generated title for the container is above a threshold percentage for associating items to containers, among other things.

For example, when mapping or otherwise associating items/products to containers, the item association module 430 may build a vocabulary set that contains all words from all the generated titles, storing information identifying a frequency of occurrence for each word of the titles. Given an item entitled "Laser Gun Target Practice Shooting Toy Desk LCD Alarm Recordable Clock Novelty," the item association module 430 may filter noise or non-product descriptive words (e.g., Practice, Recordable, Novelty, and Desk) and map the title to a generated container title, such as "Laser Target Gun Alarm Clock LCD Toy" using the dictionary.

In some example embodiments, when the title of an item matches many container titles, the item association module 430 may rank each of the container titles, such as by using an inverse frequency of compared words as a ranking factor, and map the title of the item to the best matched container title.

In some example embodiments, the item association module 430 may utilize meta-specific language models, best match algorithms or other selection algorithms to map items to containers, among other techniques.

Figure 5:
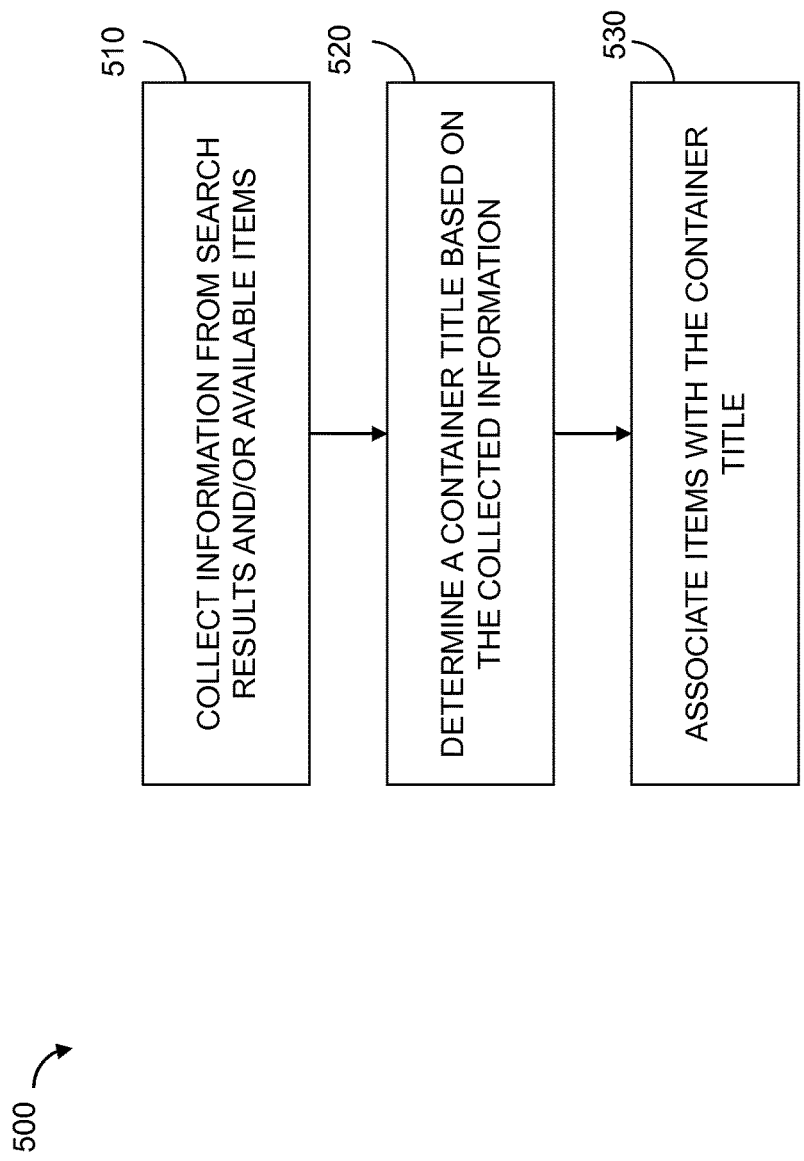
FIG. 5 is a flow diagram illustrating a method for building a container of uncategorized items, in some example embodiments.

Thus, as described herein, the container generation engine 320 may perform various methods or processes when building containers of items available for purchase within a publication system 202, among other things. FIG. 5 is a flow diagram illustrating a method 500 for building a container of uncategorized items, in some example embodiments. The method 500 may be performed by the container generation engine 320 and, accordingly, is described herein merely by way of reference thereto. It will be appreciated that the method 500 may be performed on any suitable hardware.

In operation 510, the container generation engine 320 collects information from titles of items available for purchase within the network-based publication system 202. For example, the title information module 410 may build a dictionary of titles from the titles of items available for purchase within the network-based publication system 202 and/or from contents (e.g., keywords) of search queries received by the network-based publication system 202, and/or titles or search queries at titles of items available for purchase at multiple network-based publication systems, among other locations.

In operation 520, the container generation engine 320 generates a title for a container of uncategorized items available for purchase within the network-based publication system 202 that is based on the collected information. For example, the title determination module 420 may generate titles based on contents of search queries received by the network-based publication system 202 and/or based on the titles of items available for purchase within the network-based publication system 202, based on a number of uncategorized items available for purchase to be associated to the container, and so on.

In operation 530, the container generation engine 320 associates two or more uncategorized items available for purchase within the network-based publication system 202 to the container based on a comparison of titles of the two or more uncategorized items and the generated title for the container of uncategorized items. For example, the item association module 430 may associate an uncategorized item to the container when a title for the uncategorized item includes a number of token words that match words of the generated title for the container that is above a threshold number for associating items to containers, and/or may associate an uncategorized item to the container when a percentage of token words of a title for the uncategorized item matching words of the generated title for the container is above a threshold percentage for associating items to containers, among other things.

Referring back to FIG. 4, in some example embodiments, the container linking module 440 is configured and/or programmed to link and/or associate the container to a second container within the network-based publication system 202 based on a comparison of titles of the container and the second container.

Figure 6:
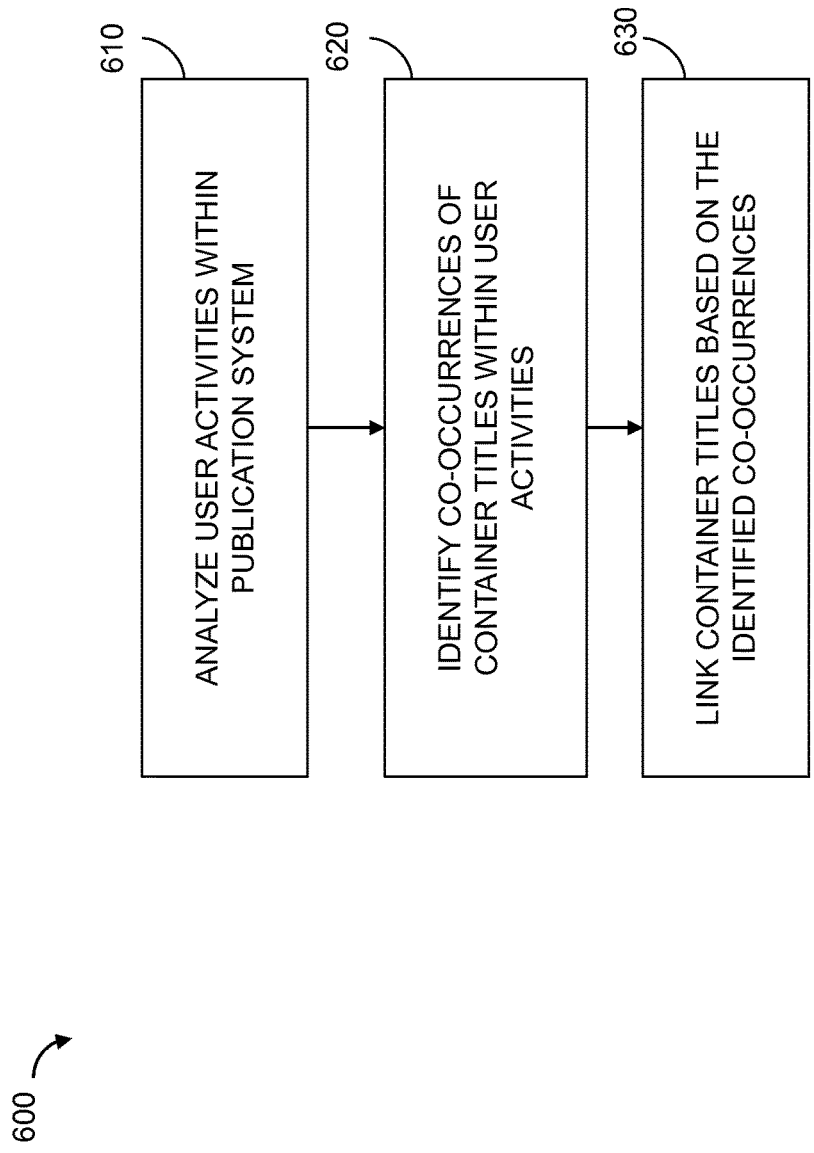
FIG. 6 is a flow diagram illustrating a method for linking containers of uncategorized items, in some example embodiments.

FIG. 6 is a flow diagram illustrating a method 600 for linking containers of uncategorized items, in some example embodiments. The method 600 may be performed by the container generation engine 320 and, accordingly, is described herein merely by way of reference thereto. It will be appreciated that the method 600 may be performed on any suitable hardware.

In operation 610, the container generation engine 320 may analyze user activities within the publication system 202. For example, the container linking module 440 may mine site session data within the publication system 202 to find pairs of containers visited in a single user session, and count all pairs of container titles visited in a session. For example, session data may indicate a User A visits container pages for shoes, shirts, and iPods®, and a User B visits container pages for shoes, shirts, and belts.

In operation 620, the container generation engine 320 may identify co-occurrences of container titles within the analyzed activities. For example, the container linking module 440 may count the co-occurrences of shoes and shirts during the user session.

In operation 630, the container generation engine 320 may link the container titles based on the identified co-occurrences. For example, the container linking module 440 may link all paired container titles in their container-based product purchase pages and/or otherwise associate the container titles during various actions (e.g., displaying of pages, presentation of search results, and so on) within the publication system 202.

Referring back to FIG. 4, in some example embodiments, the container page module 450 is configured and/or programmed to cause a display of a container-based product purchase page within the network-based publication system 202 that presents product description information for at least one of the associated uncategorized items available for purchase within the network-based publication system 202. For example, the container page module 450 may cause the container-based product purchase page (e.g., pages 100 or 150) to display product description information for a featured item that is associated with the container and product description information for at least one additional item that is associated with the container.

A featured item may be an item associated with the container that is selected based on a variety of factors, such as a likelihood of a user purchasing the featured item, a time period within which the item has been available via the publication system 202, and so on. As described herein, the container page module 450 may perform a variety of different selection processes when selecting an item as a featured item or otherwise selecting an item associated with the container to be displayed by the container-based product purchase page. Example processes performed by the container page module 450 include:

randomly selecting an item that is associated with the container and causing the container-based product purchase page to display product description information for the randomly selected item;

selecting an item associated with the container having a title that is a best match to the generated title for the container and causing the container-based product purchase page to display product description information for the selected item;

selecting an item associated with the container that is based at a location that is similar to a location of a viewer of the container-based product purchase page and causing the container-based product purchase page to display product description information for the selected item;

selecting an item associated with the container that has not been displayed within the network-based publication system within a certain time period and causing the container-based product purchase page to display product description information for the selected item; and so on.

In some example embodiments, the container page module 450 may maintain the container-based product purchase page within the network-based publication system 202 until a number of uncategorized items associated with the container is below a threshold number for maintaining a container-based product purchase page within the network-based publication system. For example, the container page module 450 may maintain a page for a certain container until one or fewer similar items are associated with the container, among other things.

Figure 7A:
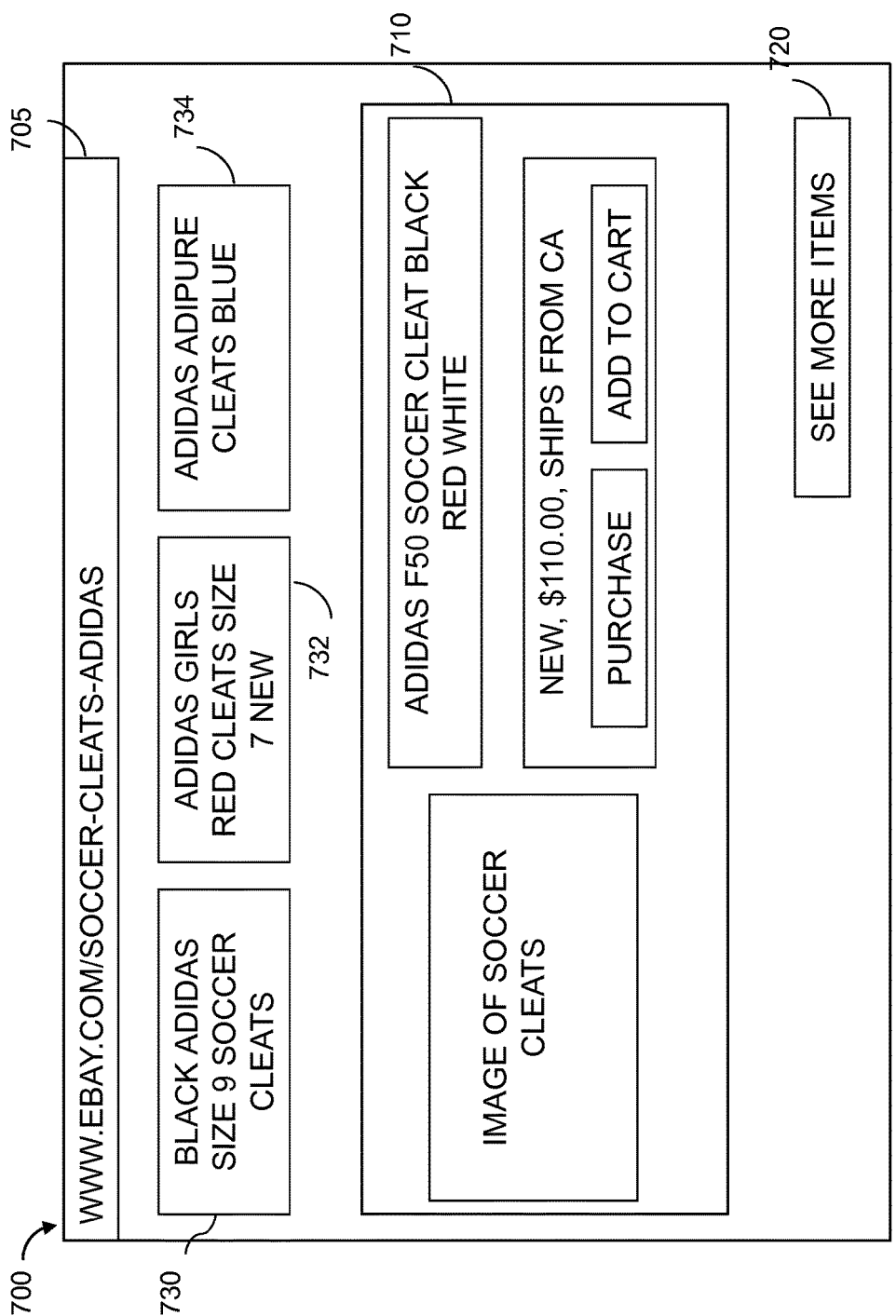
FIGS. 7A and 7B are display diagrams illustrating product pages for a container of uncategorized items, in some example embodiments.
Figure 7B:
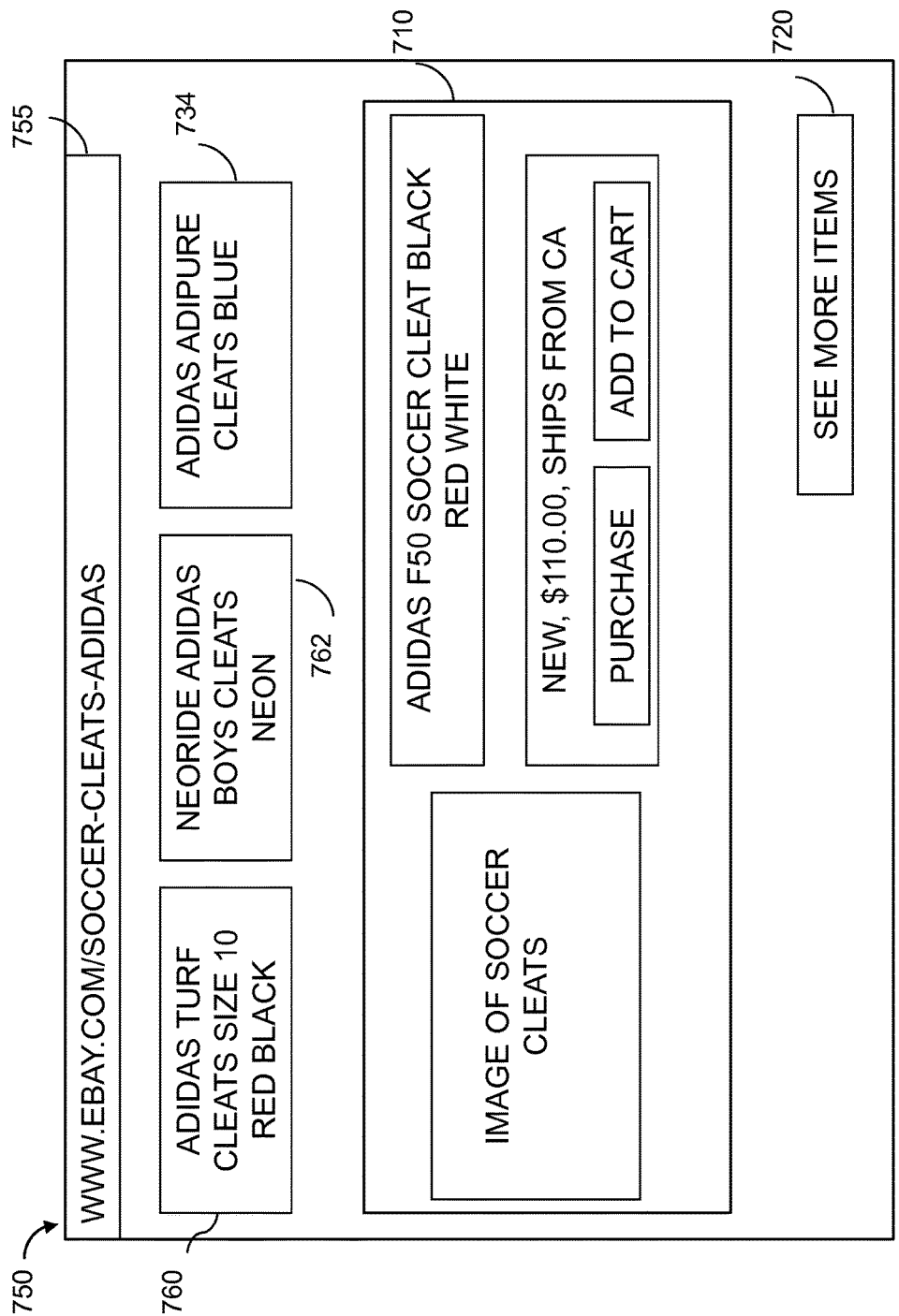

As an example, FIGS. 7A and 7B illustrate example product purchase pages for a container. FIG. 7A depicts a first product purchase page 700 for a container entitled "Soccer Cleats Adidas," as displayed by the URL 705 for the page 700. Similar to other container-based product purchase pages described herein (e.g., 100 or 150), the first product purchase page 700 includes a graphical element 710 for a featured item that is associated with the container, entitled "Adidas F50 Soccer Cleats Black Red White," and a user-selectable element 720 that facilitates the presentation of additional information for other items associated with the container.

The first product purchase page 700 also includes graphical UI elements for various different items associated with the container, such as a graphical element 730 that presents product description information for an associated item entitled "Black Adidas Size 9 Soccer Cleats," a graphical element 732 that presents product description information for an associated item entitled "Adidas Girls Red Cleats Size 7 New," and a graphical element 734 that presents product description information for an associated item entitled "Adidas Adipure Cleats Blue."

FIG. 7B depicts a second product purchase page 750 for the container entitled "Soccer Cleats Adidas," as displayed by the URL 755 for the page 750. The second product purchase page 750 is similar to the first product purchase page 700, and includes the graphical element 710 for the featured item that is associated with the container, entitled "Adidas F50 Soccer Cleats Black Red White," and the user-selectable element 720 that facilitates the presentation of additional information for other items associated with the container.

The second product purchase page 700 also includes graphical UI elements for items associated with the container that were not displayed by the first product purchase page 700, such as a graphical element 760 that presents product description information for an associated item entitled "Adidas Turf Cleats Size 10 Red Black," and a graphical element 762 that presents product description information for an associated item entitled "Neoride Adidas Boys Cleats Neon."

Thus, in some example embodiments, the container page engine 340 and/or the container page module 450 may generate a title for a container of uncategorized items available for purchase within the network-based publication system 202, associate two or more uncategorized items available for purchase within the network-based publication system 202 to the container based on a comparison of titles of the two or more uncategorized items and the generated title for the container of uncategorized items, cause a display of a container-based product purchase page within the network-based publication system 202 that is associated with the container and that presents a first configuration of product description information for uncategorized items associated with the container, determine that a group of uncategorized items associated with the container has changed, and cause a display of the container-based product purchase page within the network-based publication system 202 that presents a second configuration of product description information for the changed group of uncategorized items associated with the container.

Of course, a skilled artisan will appreciate that information may be displayed in a variety of different locations on a webpage, such as a webpage for an auction site, an online retailer, and so on, such as a main listings section, a sidebar displaying recommended or preferred products, among other things.

Thus, in some example embodiments, the systems and methods described herein enable the creation and presentation of container-based product display or purchase pages within the publication system 202, enabling the publication system 202 to maintain a dedicated location within a website (e.g., online retailer) in which various similar uncategorized products may be presented to users of the website, among other things.

Therefore, the systems and methods described herein enable the publication system 202 to maintain a page for a general category or concept of items (e.g., a canonical title that groups listings for products, irrespective of whether they are associated with products), regardless of the specific items, as long as the items can be associated with a container that supports or is otherwise associated with the page. Thus, the publication system 202 maintains the container page while current items are purchased and removed from the site and/or while new items are added to the site, facilitating access and/or purchase of items within an ever-changing inventory of products of a certain category to users of the site, among other benefits.

Examples of Presenting Container Description Information in Search Results

As described herein, in some example embodiments, the methods and systems may incorporate and/or include containers and associated items during search and retrieval operations. For example, the publication system 202 may surface and/or return a container page and/or one or more items associated with a container of items when a container title or other container description information satisfies a search query for specific items, among other things. The systems and methods may present a container title or description and/or selected items from a container along with other search results, such as product description information for specific items within the publication system.

Figure 8:
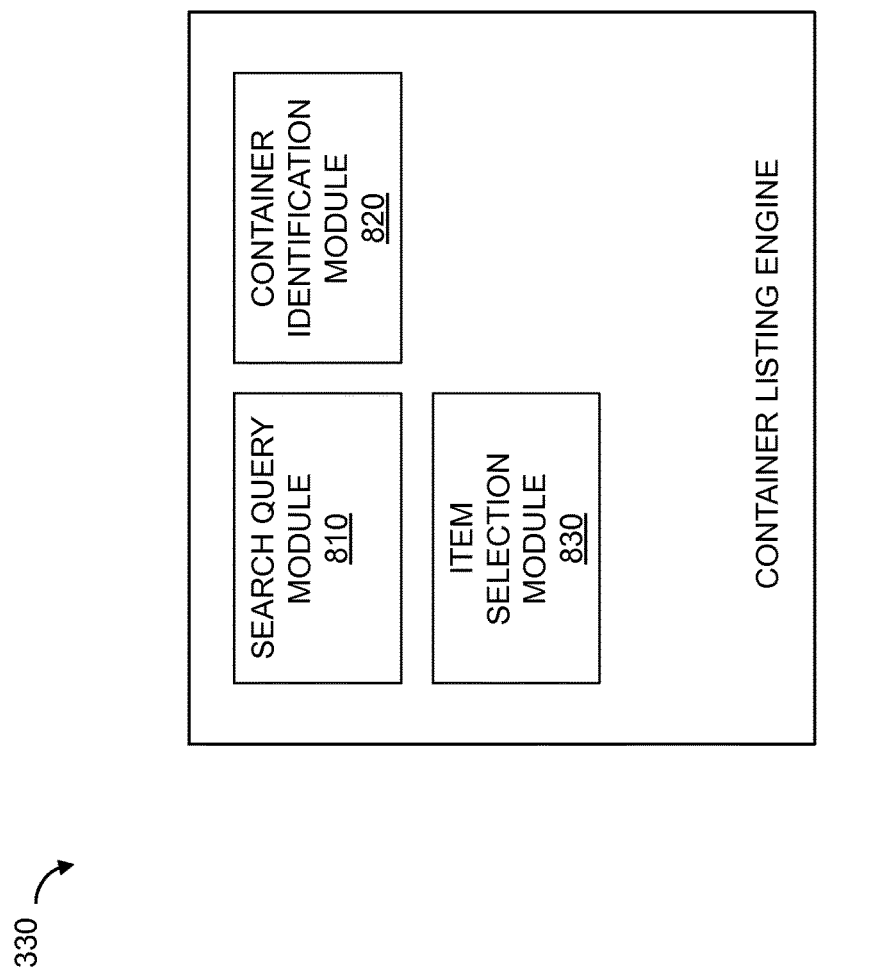
FIG. 8 is a block diagram illustrating a container listing engine, in some example embodiments.

FIG. 8 is a block diagram illustrating the container listing engine 330, in some example embodiments. As illustrated in FIG. 8, the container listing engine 330 includes a variety of functional modules. One skilled in the art will appreciate that the functional modules are implemented with a combination of software (e.g., executable instructions, or computer code) and hardware (e.g., at least a memory and processor). Accordingly, as used herein, in some example embodiments a module is a processor-implemented module and represents a computing device having a processor that is at least temporarily configured and/or programmed by executable instructions stored in memory to perform one or more of the particular functions that are described herein. Referring to FIG. 8, the container listing engine 330 includes a search query module 810, a container identification module 820, and an item selection module 830.

In some example embodiments, the search query module 810 is configured and/or programmed to access a search query received by the network-based publication system 202. For example, the search query module 810 may access one or more queries received by the searching engine 308 of the publication system 202.

In some example embodiments, the container identification module 820 is configured and/or programmed to identify a container of uncategorized items having a title that satisfies the search query. For example, the container identification module 820 may match keywords of the search query to one or more titles associated with containers in order to identify a container or containers that satisfy the search query.

In some example embodiments, the item selection module 830 is configured and/or programmed to return a result for the search query that is associated with the identified container. For example, the item selection module 830 may return a result of a product purchase page for an uncategorized item associated with the identified container and/or a result of a container-based product purchase page associated with the identified container, among other results. In some example embodiments, the returned result may include, present, and/or display an indicator that the uncategorized item is associated with the identified container.

In some example embodiments, the item selection module 830 may perform a variety of different selection processes when determining an item (e.g., a representative item) associated with a container to return as a result for a search query. Example processes include:

determining a match score for each uncategorized item associated with the identified container, adjusting the match score for each uncategorized item based on a comparison of the uncategorized item to the search query, and returning a result of a product purchase page for an uncategorized item having a best adjusted match score;

determining a match score for each uncategorized item associated with the identified container, and returning a result of a product purchase page for an uncategorized item having a best match score;

randomly selecting an uncategorized item associated with the identified container, and returning a result of a product purchase page for the randomly selected uncategorized item;

selecting an uncategorized item associated with the identified container that has not been published by the network-based publication system within a certain time period, and returning a result of a product purchase page for the selected uncategorized item;

selecting an uncategorized item associated with the identified container that has been associated with the identified container for a predetermined time period, and returning a result of a product purchase page for the selected uncategorized item; and so on.

Thus, as described herein, in some example embodiments, the publication system 202 may incorporate container description information (e.g., a container title) and/or product description information selected items associated with a container within published search results identifying products that satisfy received search queries, among other things. For example, the searching engine 208, which enables keyword queries of listings published via the publication system 202, may receive keyword queries from a computing device associated with a user (e.g., client machine 206 or 208) and conduct a review of a storage device storing listing information. The review will enable compilation of a result set of listings that may be sorted and returned to the client device of the user. The result set may include various listings, including one or more listings associated with a container of items, such as a container title described herein.

By providing container titles and other product description information within listings, the publication system 202 may avoid cases where a group of listings are mostly duplicates of similar items. For example, by listing container descriptions, the publication system 202 may compress a large inventory of items into search results, because a result having container description information represents a set or group of similar and/or duplicate products associated with a container. The publication system 202, therefore, may render a search results page with a diverse set of products, by providing container descriptions as listings within the search results page, among other things.

Thus, in some example embodiments, the publication system 202 may provide container titles to a search index of the searching engine 308. The searching engine 308, in response to a received query, may return a result that includes the container title, and present one or more listings associated with representative products of the container within a search results page, among other things.

Figure 9:
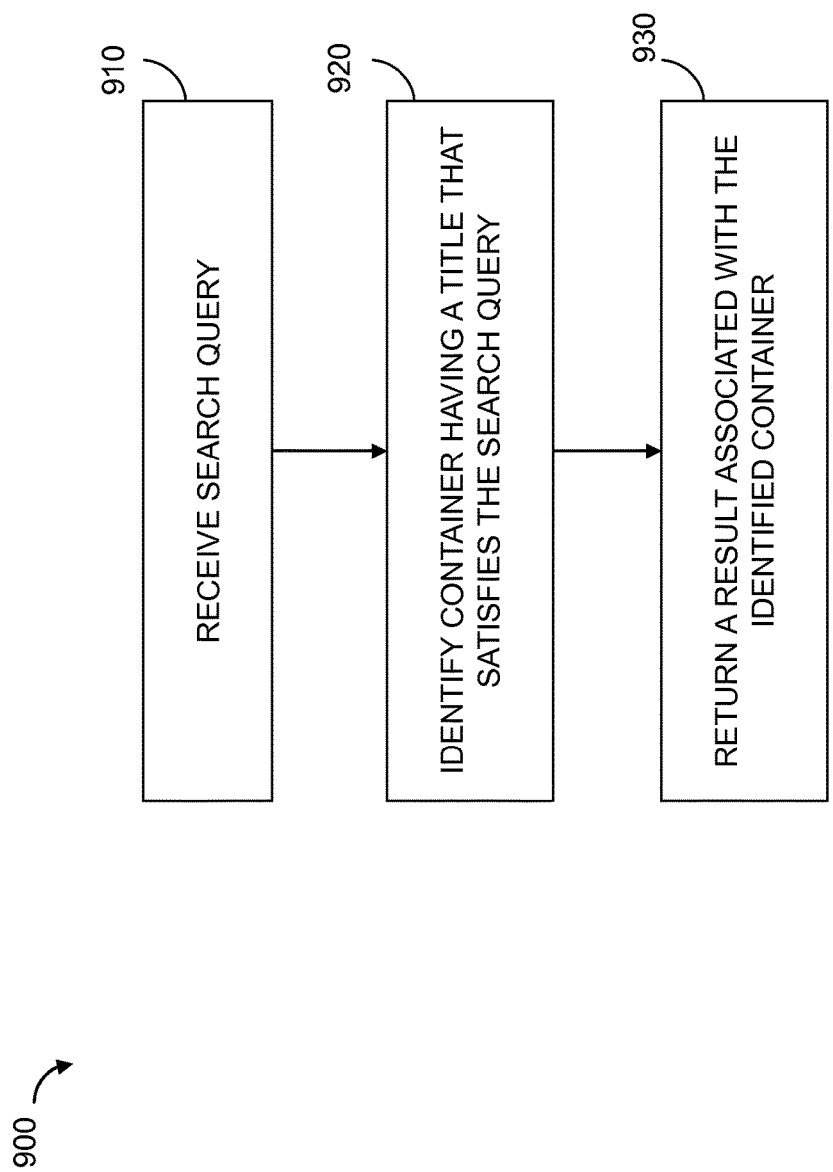
FIG. 9 is a flow diagram illustrating a method for satisfying a search query with a container result, in some example embodiments.

As described herein, in some example embodiments, the container listing engine 330 may perform various methods and/or processes when providing container-based results in response to search queries and/or other requests received by the publication system 202, such as by the searching engine 308, among other things. FIG. 9 is a flow diagram illustrating a method 900 for satisfying a search query with a container result, in some example embodiments. The method 900 may be performed by the container listing engine 330 and, accordingly, is described herein merely by way of reference thereto. It will be appreciated that the method 900 may be performed on any suitable hardware.

In operation 910, the container listing engine 330 accesses a search query received by a network-based publication system. For example, the search query module 810 may access one or more queries received by the searching engine 308 of the publication system 202.

In operation 920, the container listing engine 330 identifies a container of uncategorized items having a title that satisfies the search query. For example, the container identification module 820 may match keywords of the search query to one or more titles associated with containers in order to identify a container or containers that satisfy the search query.

In operation 930, the container listing engine 330 returns a result for the search query that is associated with the identified container. For example, the item selection module 830 may return a result of a product purchase page for an uncategorized item associated with the identified container and/or a result of a container-based product purchase page associated with the identified container, among other results. In some example embodiments, the returned result may include, present, and/or display an indicator that the uncategorized item is associated with the identified container.

Figure 10:
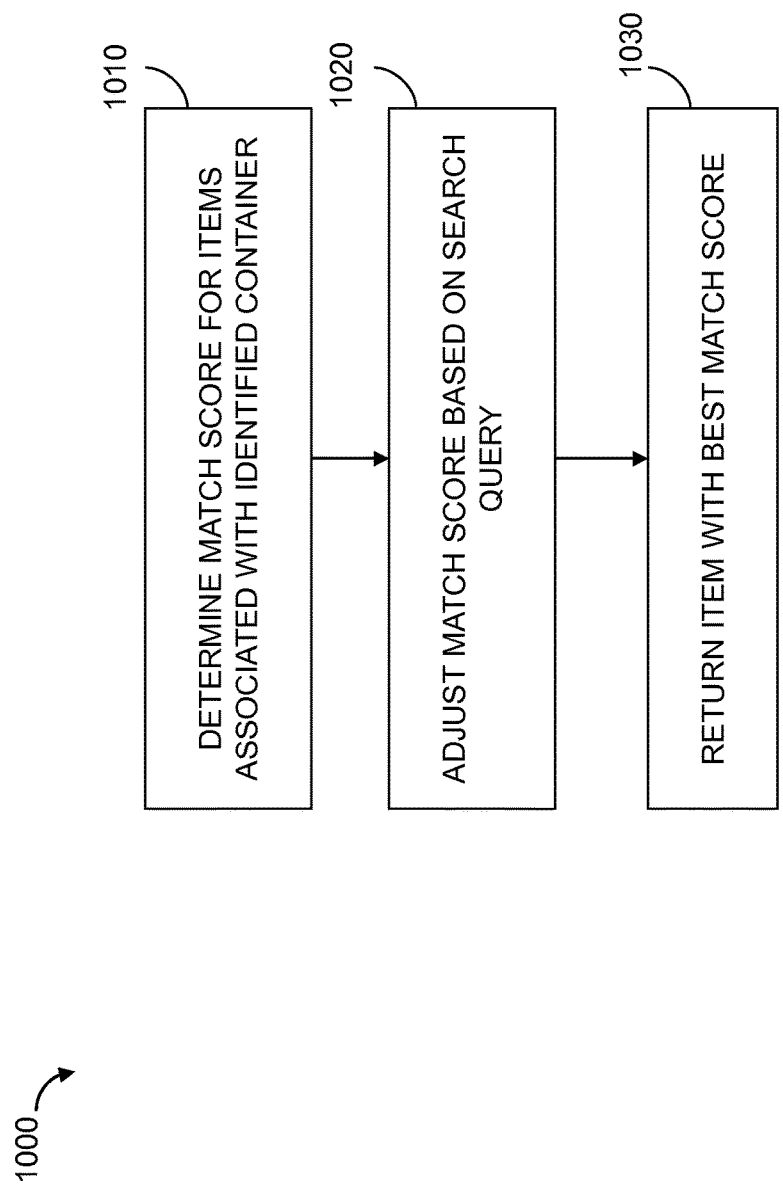
FIG. 10 is a flow diagram illustrating a method for selecting an uncategorized item to display within results of a query, in some example embodiments.

FIG. 10 is a flow diagram illustrating a method 1000 for selecting an uncategorized item to display within results of a query, in some example embodiments. The method 1000 may be performed by the container listing engine 330 and, accordingly, is described herein merely by way of reference thereto. It will be appreciated that the method 1000 may be performed on any suitable hardware.

In operation 1010, the container listing engine 330 determines a match score for each uncategorized item associated with the identified container. For example, the container listing engine 330 may tokenize a container title and identify a number of tokens within the title (e.g., 6 or more tokens)

to be used when matching description information (e.g., titles) for items to the title of the container, in order to calculate and/or determine a match score for each of the items.

In operation 1020, the container listing engine 330 adjusts the match score for each uncategorized item based on a comparison of the uncategorized item to the search query. For example, the container listing engine 330 may adjust the match score based on a comparison of keywords within the search query to the words of the titles for each of the items. In operation 1030, the container listing engine 330 returns a result of a product purchase page for an uncategorized item having a best adjusted match score.

Figure 11:
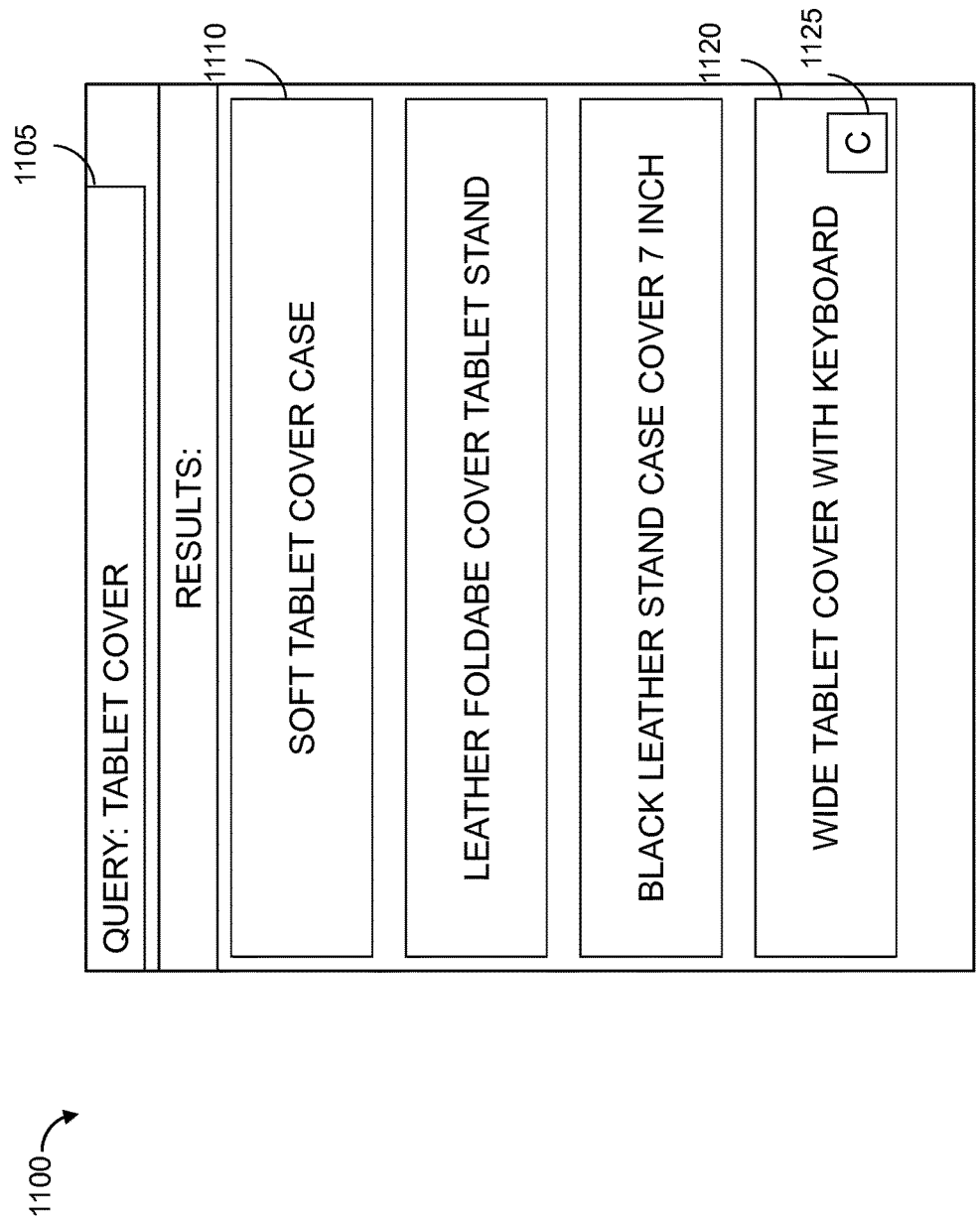
FIG. 11 is a display diagram illustrating a product results page that includes a listing associated with a container of uncategorized items, in some example embodiments.

FIG. 11 is a display diagram illustrating a product results page 1100 that includes a listing associated with a container of uncategorized items, in some example embodiments. The product results page 1100 displays a variety of results 1110 for items that match a search query 1105 of "tablet cover," as well as result 1120 that is associated with a container page for a container of associated, uncategorized items. In order to identify the result 1120 as a result associated with a container of items, the result 1120 includes a symbol 1125 that indicates the result represents the container of items.

In some example embodiments, the container listing engine 330 may generate, modify, and/or configure a product purchase page associated with a container based on an accessed search query. For example, the container listing engine 330 may access a search query received by a network-based publication system, identify a container of uncategorized items having a title that satisfies the search query, generate a container-based product purchase page associated with the identified container that includes a configuration based on the search query, and return a result for the search query that is associated with the generated container-based product purchase page having the configuration based on the search query. The configuration may include certain items having titles that best match the search query, certain items at locations associated with a location of a user providing the search query, and so on.

Therefore, the publication system 202 may surface items, products, containers, and/or other groupings (e.g., categories, concepts, and so on) of uncategorized products or items within search results, in order to provide a diverse set of results in response to a search query received by the publication system 202, enabling users of the publication system 202 to encounter and obtain information for a variety of different products that may satisfy a search query, among other benefits.

Examples of Building Containers of Items at Multiple Network-Based Locations

As described herein, in some example embodiments, the container engine 312 may build containers and/or publish container-based product purchase pages for items available for purchase at a variety of different and/or diverse locations over a network, among other things. For example, the container engine 312 may be part of an application or "app" (e.g., programmatic client 212) that brokers purchases of items between buyers using the app to locate and purchase items from a variety of locations and sellers using the app to publish their items to be purchased by the buyers.

Figure 12:
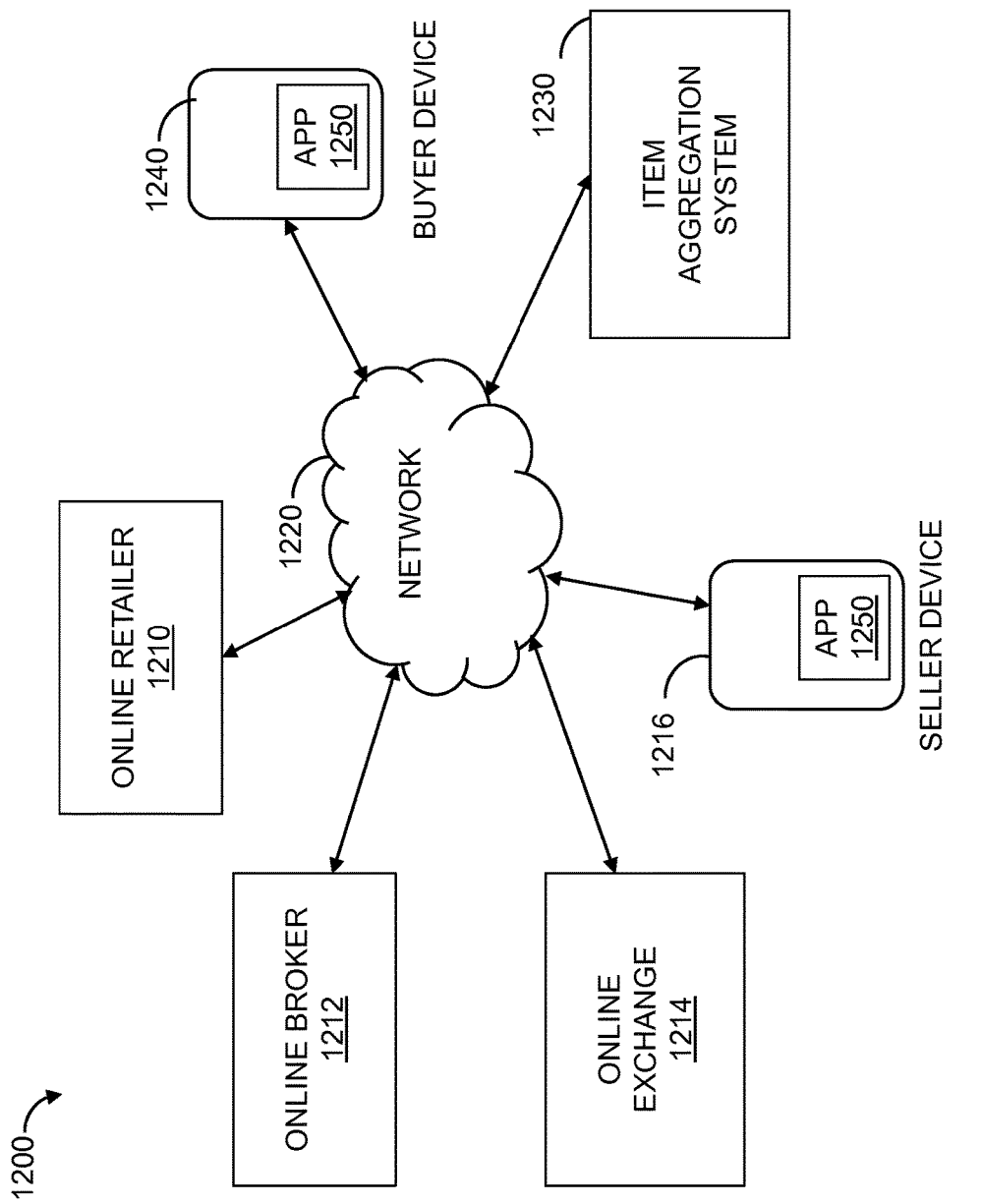
FIG. 12 is a block diagram illustrating a network architecture of a suitable computing environment for building and displaying containers of uncategorized items at multiple networked locations, in some example embodiments.

FIG. 12 is a block diagram illustrating a network architecture 1200 of a suitable computing environment for building and displaying containers of uncategorized items at multiple networked locations, in some example embodiments. The network architecture 1200 includes a variety of retailers in communication with buyers over a network 1220, such as an online retailer 1210, an online broker 1212, an online exchange 1214, an individual seller device 1216, and so on. The various selling locations 1210-1216 may publish items available for purchase via an app 1250 or other mechanism, which is utilized by a buyer via a buyer device 1240, such as a mobile device (e.g., a smart phone, tablet computer, laptop, and so on). The app 1250, which facilitates the exchange of information between buyers and sellers at the multiple locations, similar to the publication system 202 described herein, may be associated with an item aggregation system 1230 that aggregates information for available items at the various locations 1210-1216, builds containers for the items, and generates pages to be displayed by the app 1250 in order to facilitate the access and purchase of the items by the buyers, among other things.

Figure 13:
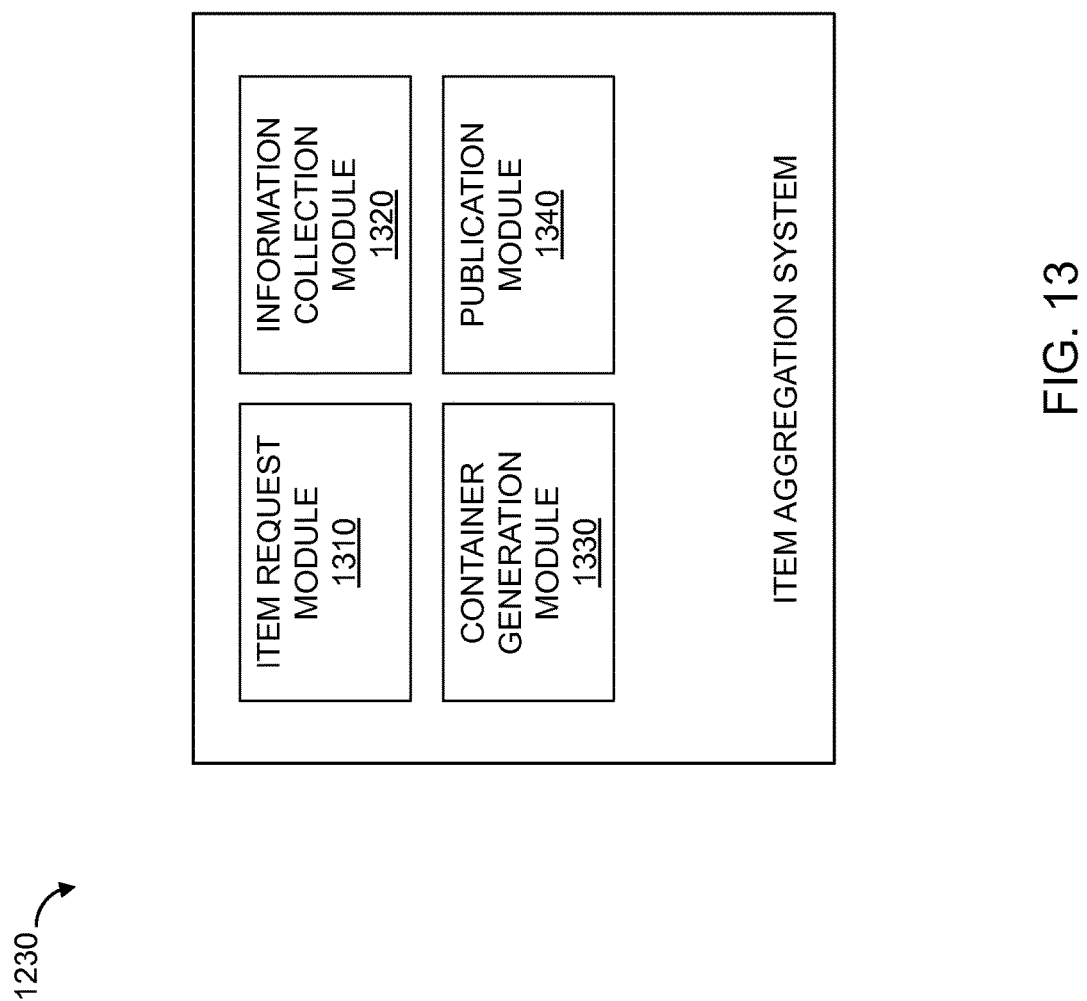
FIG. 13 is a block diagram illustrating an item aggregation system, in some example embodiments.

FIG. 13 is a block diagram illustrating the item aggregation system 1230, in some example embodiments. As illustrated in FIG. 13, the item aggregation system 1230 includes a variety of functional modules. One skilled in the art will appreciate that the functional modules are implemented with a combination of software (e.g., executable instructions, or computer code) and hardware (e.g., at least a memory and processor). Accordingly, as used herein, in some example embodiments a module is a processor-implemented module and represents a computing device having a processor that is at least temporarily configured and/or programmed by executable instructions stored in memory to perform one or more of the particular functions that are described herein. Referring to FIG. 13, the item aggregation system 1230 includes an item request module 1310, an information collection module 1320, a container generation module 1330, and a publication module 1340.

In some example embodiments, the item request module 1310 is configured and/or programmed to access a search request for items available for purchase via a network-based location. The item request module 1310 may access a search request received by the searching engine 308 or other similar engine provided by the app 1250. For example, the app 1250 may receive a search request for available items from a user associated with the buyer device 1240.

In some example embodiments, the information collection module 1320 is configured and/or programmed to collect information associated with available items having product description information satisfying the search request and located at multiple network-based locations. For example, the information collection module 1320 may collect information from at least one online retailer (e.g., online retailer 1210) and at least one online broker of items (e.g., broker 1212) and/or collect information from at least one online retailer (e.g., online retailer 1210) and at least one individual seller (e.g., a user associated with seller device 1216), among other scenarios.

In some example embodiments, the container generation module 1330 is configured and/or programmed to determine one or more containers that associate items available for purchase based on the collected information. The container generation module 1330 may generate titles for the one or more containers based on the titles of the available items at the various locations, based on keywords of the search request, and so on. For example, the container generation module 1330 may include various modules of the container generation engine 320, including the title determination module 420, which generates titles for the one or more containers based on the collected information and/or the search request, and the item association module 430, which associates the available items to the one or more containers based on a comparison of titles of the available items and the generated titles for the one or more containers, as described herein.

In some example embodiments, the container generation module 1330 may dynamically determine the one or more containers in response to the search query. For example, the container generation module 1330 may dynamically determine the one or more containers based on a number of items available for purchase via the multiple network-based locations at the time of a received search request, based on a number of items available for purchase via the multiple network-based locations that are associated with product description information that satisfies the search request, and so on.

In some example embodiments, the publication module 1340 is configured and/or programmed to publish a result for the search request that is based on the determined containers. For example, the publication module 1340 may publish a result for the search request that includes at least one listing representative of a determined container, such as a listing including a title for the container and number of items associated with the container, and/or a listing including a title for the container, a number of items associated with the container, and a number of items associated with the container at a location from which the search request was received, among other things.

In some example embodiments, the publication module 1340 may publish a list of information representative of the determined one or more containers that is ranked according to a number of items associated with each container, and/or publish a result for the search request that includes a listing presenting product description information for a container of items and a listing presenting product description information for an individual item, among other things.

Figure 14:
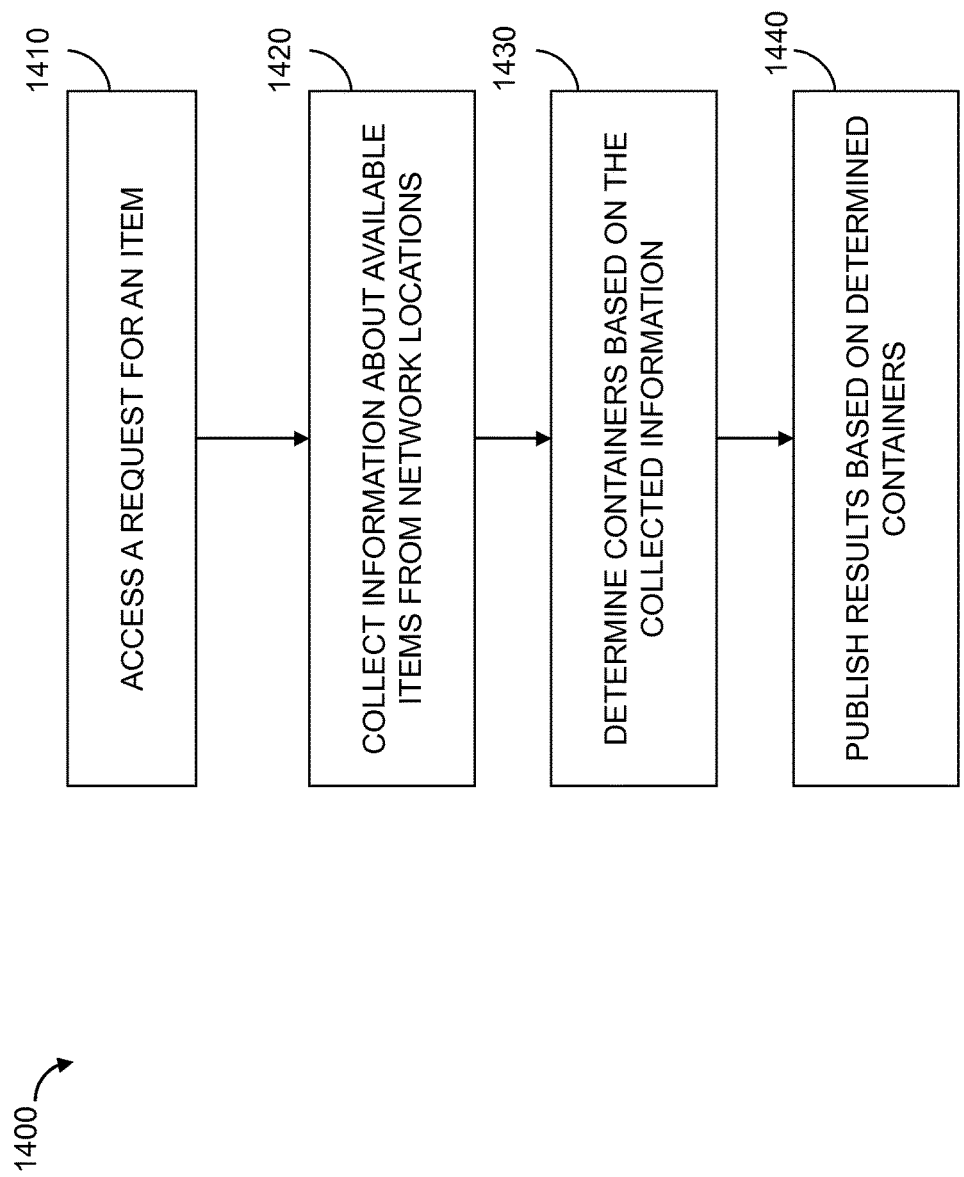
FIG. 14 is a flow diagram illustrating a method for publishing a listing of available items, in some example embodiments.

As described herein, the item aggregation system 1230 may perform a variety of methods and/or processes in order to publish a listing of similar items available for purchase at multiple different locations over a network, among other things. FIG. 14 is a flow diagram illustrating a method for publishing a listing of available items, in some example embodiments. The method 1400 may be performed by the item aggregation system 1230 and, accordingly, is described herein merely by way of reference thereto. It will be appreciated that the method 1400 may be performed on any suitable hardware.

In operation 1410, the item aggregation system 1230 accesses a search request for items available for purchase via a network-based location. For example, the item request module 1310 may access a search request received by the searching engine 308 or other similar engine provided by the app 1250, such as a search request for available items received from a user associated with the buyer device 1240.

In operation 1420, the item aggregation system 1230 collects information associated with available items having product description information satisfying the search request and located at multiple network-based locations. For example, the information collection module 1320 may collect information from at least one online retailer (e.g., online retailer 1210) and at least one online broker of items (e.g., broker 1212) and/or collect information from at least one online retailer (e.g., online retailer 1210) and at least one individual seller (e.g., a user associated with seller device 1216), among other scenarios.

In operation 1430, the item aggregation system 1230 determines one or more containers that associate items available for purchase based on the collected information. For example, the container generation module 1330 may generate titles for the one or more containers based on the titles of the available items at the various locations, based on keywords of the search request, and so on. The container generation module 1330 may include various modules of the container generation engine 320, including the title determination module 420, which generates titles for the one or more containers based on the collected information and/or the search request, and the item association module 430, which associates the available items to the one or more containers based on a comparison of titles of the available items and the generated titles for the one or more containers, as described herein.

In operation 1440, the item aggregation system 1230 publishes a result for the search request that is based on the determined containers. For example, the publication module 1340 may publish a result for the search request that includes at least one listing representative of a determined container, such as a listing including a title for the container and a number of items associated with the container, and/or a listing including a title for the container, a number of items associated with the container, and a number of items associated with the container at a location from which the search request was received, among other things.

FIG. 15 is a display diagram illustrating a results page 1500 that includes a listing associated with a container of uncategorized items from multiple networked locations, in some example embodiments. The results page 1500 displays various container-based results for a received query 1505 of "baby carriers." The results page 1500, which is configured to display the results via a user interface of a mobile device, displays various user selectable graphical elements 1510-1550 that present description information for containers of items that have titles that satisfy the search query 1505.

For example, the results page 1500 includes a user-selectable element 1510 that presents description information for a container entitled "moby baby wrap," including information identifying a number of items associated with the container (e.g., "100+"), a number of items local to a user that provided the search query, and so on. The results page also includes a user-selectable element 1560 that, when selected, facilitates the display of additional containers, among other things.

Thus, in some example embodiments, the item aggregation system 1230 builds containers, concepts, or other categories of uncategorized items available for purchase at various different and/or diverse locations or sites over a network, enabling a mobile application or other publication system to display listings of available items without displaying redundant or virtually identical items as separate listings, facilitating users of the application to access and/or find items of interest quickly and efficiently, among other benefits.

Figure 16:
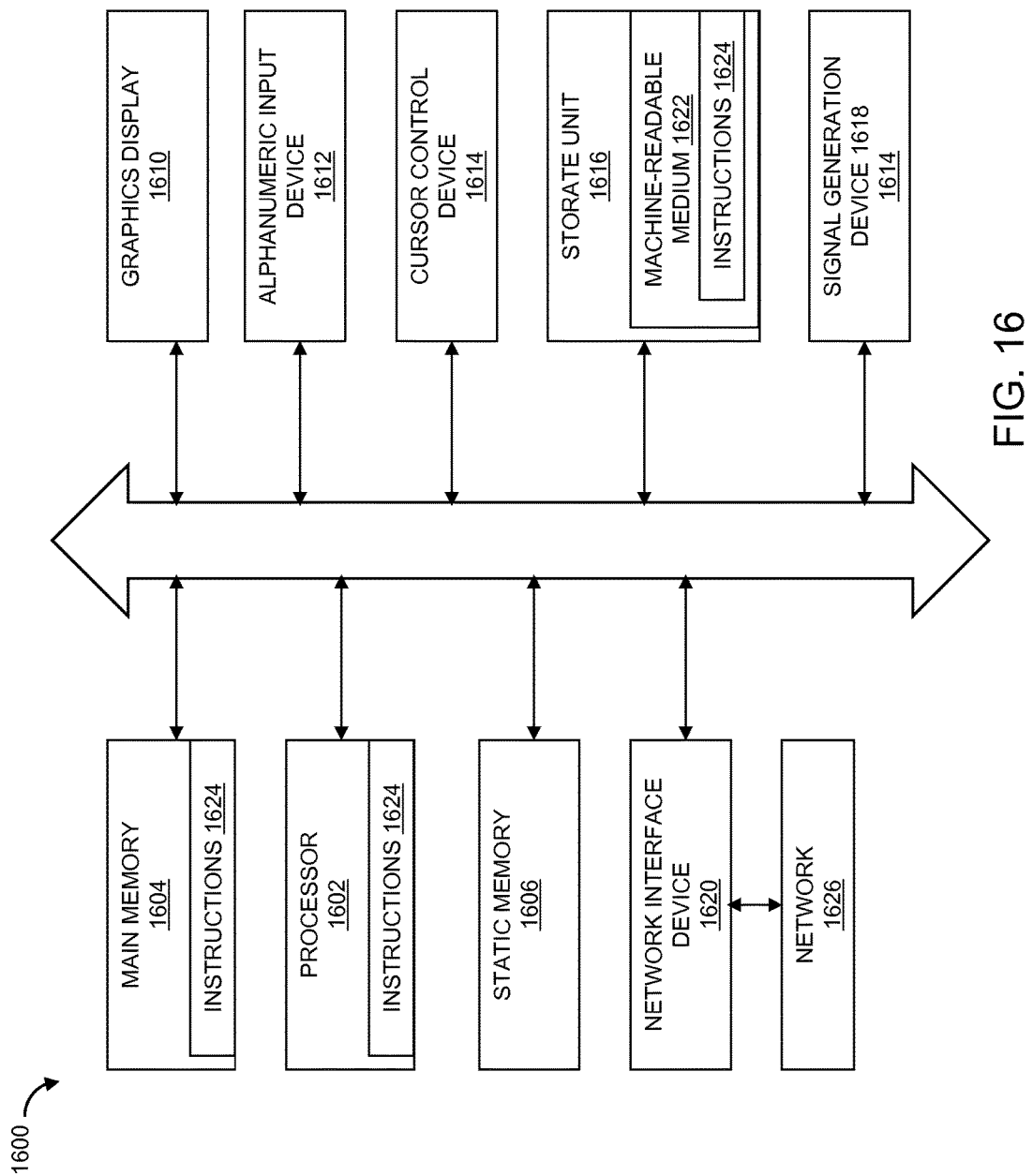
FIG. 16 is a diagrammatic representation of a machine in the example form of a computer system within which a set of instructions may be executed to cause the machine to perform any one or more of the methodologies discussed herein.

FIG. 16 shows a diagrammatic representation of machine in the exemplary form of a computer system 1600 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1600 includes a processor 1602 (e.g., a central processing unit (CPU), a graphics processing unit (GPU) or both), a main memory 1604 and a static memory 1606, which communicate with each other via a bus 1608. The computer system 1600 may further include a video display unit 1610 (e.g., a liquid crystal display (LCD) or a cathode ray tube (CRT)). The computer system 1600 also includes an alphanumeric input device 1612 (e.g., a keyboard), a cursor control device 1614 (e.g., a mouse), a disk drive unit 1616, a signal generation device 1618 (e.g., a speaker) and a network interface device 1620.

The disk drive unit 1616 includes a machine-readable medium 1622 on which is stored one or more sets of instructions (e.g., software 1624) embodying any one or more of the methodologies or functions described herein. The software 1624 may also reside, completely or at least partially, within the main memory 1604 and/or within the processor 1602 during execution thereof by the computer system 1600, the main memory 1604 and the processor 1602 also constituting machine-readable media. The software 1624 may further be transmitted or received over a network 1626 via the network interface device 1620.

While the machine-readable medium 1622 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and other storage media.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an application-specific integrated circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

Although the present disclosure has been described with reference to specific exemplary embodiments, it may be evident that various modifications and changes may be made to these embodiments without departing from the broader spirit and scope of the disclosure. Accordingly, the specification and drawings are to be regarded in an illustrative rather than a restrictive sense.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

What is claimed is:

1. A system including at least one hardware-implemented processor, comprising:
   an item request module that is configured on the at least one processor to access a search request received from a client device for items available for purchase via a network-based location, the available items including a plurality of categorized items and a plurality of uncategorized items, the plurality of categorized items assigned respective categories in a hierarchy of categories, the plurality of uncategorized items not assigned respective categories in the hierarchy of categories;
   an information collection module on the at least one processor that is configured to collect information associated with available items having product description information satisfying the search request and located at multiple network-based locations, and recorded user navigation information;
   a container generation module that is configured on the at least one processor to carry out functions comprising:
      subsequent to receiving the search request, automatically creating a first container, the first container comprising a container title reflecting a common first attribute; and
      automatically associating two or more of the plurality of uncategorized items available for purchase to the first container based on a similarity of the collected information to the common first attribute, each of the two or more of the plurality of uncategorized items in the first container remaining uncategorized;
   a searching module on the at least one processor that responds to the search request with a result comprising the first container, the first container comprising the two or more of the plurality of uncategorized items; and
   a publication module that is configured on the at least one processor to return the result to a user interface on the client device in response to the search request.

2. The system of claim 1, wherein the container generation module includes:
   a title determination module that is configured to generate titles for the one or more containers based on the collected information; and
   an item association module that is configured to associate the available items to the one or more containers based on a comparison of titles of the available items and the generated titles for the one or more containers.

3. The system of claim 1, wherein the container generation module includes:
   a title determination module that is configured to generate titles for the one or more containers based on the collected information and based on contents of the search request; and
   an item association module that is configured to associate the available items to the one or more containers based on a comparison of titles of the available items and the generated titles for the one or more containers.

4. The system of claim 1, wherein the container generation module includes:
   a title determination module that is configured to generate titles for the one or more containers based on contents of the search request; and
   an item association module that is configured to associate the available items to the one or more containers based on a comparison of titles of the available items and the generated titles for the one or more containers.

5. The system of claim 1, wherein the container generation module is configured to dynamically determine the one or more containers in response to the search query.

6. The system of claim 1, wherein the container generation module is configured to determine the one or more containers based on a number of items available for purchase via the multiple network-based locations.

7. The system of claim 1, wherein the container generation module is configured to determine the one or more containers based on a number of items available for purchase via the multiple network-based locations that are associated with product description information that satisfies the search request.

8. The system of claim 1, wherein the information collection module is configured to collect information from at least one online retailer and at least one online broker of items.

9. The system of claim 1, wherein the information collection module is configured to collect information from at least one online retailer and at least one individual seller.

10. The system of claim 1, wherein the publication module is configured to publish a result for the search request that includes at least one listing representative of a determined container, the listing including a title for the container and number of items associated with the container.

11. The system of claim 1, wherein the publication module is configured to publish a result for the search request that includes at least one listing representative of a determined container, the listing including a title for the container, a number of items associated with the container, and a number of items associated with the container at a location from which the search request was received.

12. The system of claim 1, wherein the publication module is configured to publish a result for the search request that includes a list of information representative of the determined one or more containers that is ranked according to a number of items associated with each container.

13. The system of claim 1, wherein the publication module is configured to publish a result for the search request that includes a listing presenting product description information for a container of items and a listing presenting product description information for an individual item.

14. A computer-implemented method with at least one hardware-implemented processor, comprising:
   accessing, with the at least one processor, a search request received from a client device for items available for purchase via a network-based location, the available items including a plurality of categorized items and a plurality of uncategorized items, the plurality of categorized items assigned respective categories in a hierarchy of categories, the plurality of uncategorized items not assigned respective categories in the hierarchy of categories;
   collecting, with the at least one processor, information associated with available items having product description information satisfying the search request and located at multiple network-based locations, and recorded user navigation information;
   automatically creating, with the at least one processor, a first container, the first container comprising a container title reflecting a common first attribute;
   associating, with the at least one processor, two or more of the plurality of uncategorized items available for purchase to the first container based on a similarity of the collected information to the common first attribute, each of the two or more of the plurality of uncategorized items in the first container remaining uncategorized;
   responding, with the at least one processor, to the search request with a result comprising the first container, the first container comprising the two or more of the plurality of uncategorized items; and
   returning, with the at least one processor, the result to a user interface on the client device in response to the search request.

15. The method of claim 14, wherein determining one or more containers that associate items available for purchase includes:
   generating titles for the one or more containers based on the collected information; and associating the available items to the one or more containers based on a comparison of titles of the available items and the generated titles for the one or more containers.

16. The method of claim 14, wherein determining one or more containers that associate items available for purchase includes:
   generating titles for the one or more containers based on the collected information and based on contents of the search request; and
   associating the available items to the one or more containers based on a comparison of titles of the available items and the generated titles for the one or more containers.

17. The method of claim 14, wherein determining one or more containers that associate items available for purchase includes:
   generating titles for the one or more containers based on contents of the search request; and
   associating the available items to the one or more containers based on a comparison of titles of the available items and the generated titles for the one or more containers.

18. The method of claim 14, wherein determining one or more containers that associate items available for purchase includes dynamically determining the one or more containers in response to the search query.

19. The method of claim 14, wherein determining one or more containers that associate items available for purchase includes determining the one or more containers based on a number of items available for purchase via the multiple network-based locations.

20. A computer-readable storage medium whose contents, when executed by a computing system with at least one hardware-implemented processor, cause the computing system to perform operations, comprising:
   accessing a search request received from a client device for items available for purchase via multiple network-based locations, the available items including a plurality of categorized items and a plurality of uncategorized items, the plurality of categorized items assigned respective categories in a hierarchy of categories, the plurality of uncategorized items not assigned respective categories in the hierarchy of categories;
   collecting information associated with available items having product description information satisfying the search request and located at multiple network-based locations, and recorded user navigation information;
   automatically creating a first container, the first container comprising a container title reflecting a first common attribute;
   associating two or more of the plurality of uncategorized items available for purchase to the first container based on a similarity of the collected information to the first common attribute, each of the two or more of the plurality of uncategorized items in the first container remaining uncategorized;
   responding to the search request with a result comprising the first container, the first container comprising the two or more of the plurality of uncategorized items; and
   returning the result to a user interface on the client device in response to the search request.

* * * * *